US012100966B2

(12) United States Patent
Lethellier et al.

(10) Patent No.: US 12,100,966 B2
(45) Date of Patent: Sep. 24, 2024

(54) BIPLANE WIRELESS POWER TRANSFER PAD

(71) Applicant: Wireless Advanced Vehicle Electrification, LLC, Salt Lake City, UT (US)

(72) Inventors: Patrice Lethellier, Salt Lake City, UT (US); Kelly Wardell, Stansbury Park, UT (US); Adeel Zaheer, West Valley, UT (US)

(73) Assignee: Wireless Advanced Vehicle Electrification, LLC, Salt Lake City, UT (US)

( * ) Notice: Subject to any disclaimer, the term of this patent is extended or adjusted under 35 U.S.C. 154(b) by 0 days.

(21) Appl. No.: 17/551,743

(22) Filed: Dec. 15, 2021

(65) Prior Publication Data

US 2022/0263344 A1    Aug. 18, 2022

Related U.S. Application Data

(60) Provisional application No. 63/149,945, filed on Feb. 16, 2021.

(51) Int. Cl.
*H02J 50/00* (2016.01)
*H02J 50/12* (2016.01)
(Continued)

(52) U.S. Cl.
CPC ............ *H02J 50/005* (2020.01); *H02J 50/12* (2016.02); *H02J 50/40* (2016.02); *H02J 50/90* (2016.02)

(58) Field of Classification Search
CPC .......... H02J 50/005; H02J 50/12; H02J 50/40; H02J 50/90; H02J 7/02; H01F 27/24; H01F 27/38; H01F 38/14
See application file for complete search history.

(56) References Cited

U.S. PATENT DOCUMENTS 6,803,744 B1 *  10/2004  Sabo .................... H02J 7/00302
                                                                    320/108
9,780,572 B2    10/2017  Standke et al.
(Continued)

FOREIGN PATENT DOCUMENTS

RU        2505919 C1      1/2014
WO     2012018268 A1      2/2012
(Continued)

OTHER PUBLICATIONS

International Application No. PCT/US17/21971, filed Mar. 10, 2017, International Search Report and Written Opinion, dated Aug. 14, 2017.
(Continued)

*Primary Examiner* — Daniel Kessie
*Assistant Examiner* — Brian K Baxter
(74) *Attorney, Agent, or Firm* — Kunzler Bean & Adamson; Bruce R. Needham

(57) ABSTRACT

Described herein is a structure, the implementation of which may result in optimization of power transfer within a wireless power transfer pad. Such a structure comprises two planes in parallel that each comprise multiple windings. Additionally, the structure may include two magnetic structures that each pass through the centers of the multiple windings of one of the respective planes. In some embodiments, a magnetic structure may include a main section and two vertical sections. In some cases, the magnetic structure may further include at least one side section that connects with a vertical section.

15 Claims, 19 Drawing Sheets

(51) Int. Cl.
    *H02J 50/40*           (2016.01)
    *H02J 50/90*           (2016.01)

(56) References Cited

U.S. PATENT DOCUMENTS

| | | | |
|---|---|---|---|
| 9,837,204 B2 | 12/2017 | Widmer et al. | |
| 9,954,387 B2 | 4/2018 | Sultenfuss et al. | |
| 10,354,794 B2* | 7/2019 | Budhia | H01F 38/14 |
| 2008/0129246 A1 | 6/2008 | Morita et al. | |
| 2013/0033351 A1 | 2/2013 | Kim et al. | |
| 2013/0214735 A1 | 8/2013 | Kang et al. | |
| 2013/0270921 A1 | 10/2013 | Boys et al. | |
| 2014/0028109 A1* | 1/2014 | Simon | H02J 50/12 |
| | | | 307/104 |
| 2014/0327391 A1 | 11/2014 | Niederhauser et al. | |
| 2015/0077053 A1 | 3/2015 | Stamenic et al. | |
| 2015/0170833 A1* | 6/2015 | Widmer | H02J 50/12 |
| | | | 307/104 |
| 2015/0236513 A1 | 8/2015 | Covic et al. | |
| 2015/0364929 A1 | 12/2015 | Davis et al. | |
| 2016/0013661 A1* | 1/2016 | Kurs | H02J 50/005 |
| | | | 307/104 |
| 2016/0087477 A1 | 3/2016 | Jeong et al. | |
| 2017/0040826 A1* | 2/2017 | Arendarik | H01F 38/14 |
| 2017/0264130 A1* | 9/2017 | Lethellier | B60L 53/34 |
| 2017/0271926 A1 | 9/2017 | Plekhanov et al. | |
| 2017/0317532 A1 | 11/2017 | Kanagawa et al. | |
| 2017/0326991 A1* | 11/2017 | Budhia | H02J 50/10 |
| 2018/0061563 A1* | 3/2018 | Budhia | H01F 38/14 |
| 2018/0334050 A1* | 11/2018 | Widmer | B60L 53/126 |
| 2019/0310671 A1* | 10/2019 | Ishikawa | G05F 1/10 |
| 2020/0013549 A1 | 1/2020 | Samuelsson | |
| 2020/0220267 A1 | 7/2020 | Kurokawa | |
| 2020/0357569 A1* | 11/2020 | Lohmann | H02J 50/70 |
| 2021/0012959 A1 | 1/2021 | Pei et al. | |
| 2021/0066949 A1* | 3/2021 | Stingu | H02M 7/4815 |
| 2021/0091601 A1 | 3/2021 | Kim et al. | |
| 2021/0276436 A1* | 9/2021 | Enderlin | H01F 38/14 |
| 2021/0384754 A1* | 12/2021 | Xu | H01F 7/0247 |
| 2021/0399577 A1* | 12/2021 | Qiu | H01F 38/14 |
| 2022/0140664 A1* | 5/2022 | Dearden | H02J 50/005 |
| | | | 307/104 |
| 2023/0117713 A1* | 4/2023 | Kuwayama | B60C 11/0332 |
| | | | 152/152.1 |
| 2023/0187968 A1 | 6/2023 | Lyden | |

FOREIGN PATENT DOCUMENTS

| | | |
|---|---|---|
| WO | 2016077139 A1 | 5/2016 |
| WO | 2017093255 A1 | 6/2017 |

OTHER PUBLICATIONS

Professor J T Boys and Professor G A Covic, IPT Fact Sheet Series: No. 1—Basic Concepts, The University of Auckland, 2013.
Non-Final Office Action dated Mar. 3, 2023 from U.S. Appl. No. 17/742,250, 36 pages.
International Application No. PCT/US2021/063516, filed Dec. 15, 2021, Written Opinion of the International Searching Authority, dated Apr. 19, 2022.
U.S. Appl. No. 17/742,250, filed May 11, 2022, Final Office Action mailed Oct. 30, 2023, pp. 1-21.

\* cited by examiner

Ferrite Structure

Windings

Ferrite Structure and Windings

Section A-A'

BIPLANE WIRELESS POWER TRANSFER PAD

PRIORITY CLAIM

This application claims priority from and the benefit of U.S. Provisional Application No. 63/149,945, filed Feb. 16, 2021, entitled, "BI-PLANE WIRELESS POWER TRANSFER PAD," which is incorporated by reference herein in its entirety.

This invention was made with government support under contract DE-EE0008360 by the Department of Energy. The government has certain rights in the invention.

BACKGROUND

As the world becomes more aware of the impact that the use of fossil fuels is having on the environment, the demand for environmentally friendly alternatives is increasing. In the realm of transportation, vehicles that are powered by fossil fuels are being replaced by alternatives including partially or fully electric vehicles. In some cases, entire fleets of vehicles, such as busses, are being replaced by electric vehicles. However, despite this increase in popularity, electric vehicles are subject to their own unique set of problems. For example, the range of an electric vehicle is often dependent upon the amount of charge that can be, or is, stored in a battery of that vehicle. This can be, and typically is, mitigated via the use of electric charging stations that may include wireless charging pads. For example, in the case of an electric bus, such wireless charging pads may be placed throughout a transit route that is traversed by the bus (e.g., at bus stops) to provide periodic recharging for the bus. However, it may be difficult to embed wireless charging pads within a given space while optimizing and/or increasing the efficiency and/or safety of those wireless charging pads.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
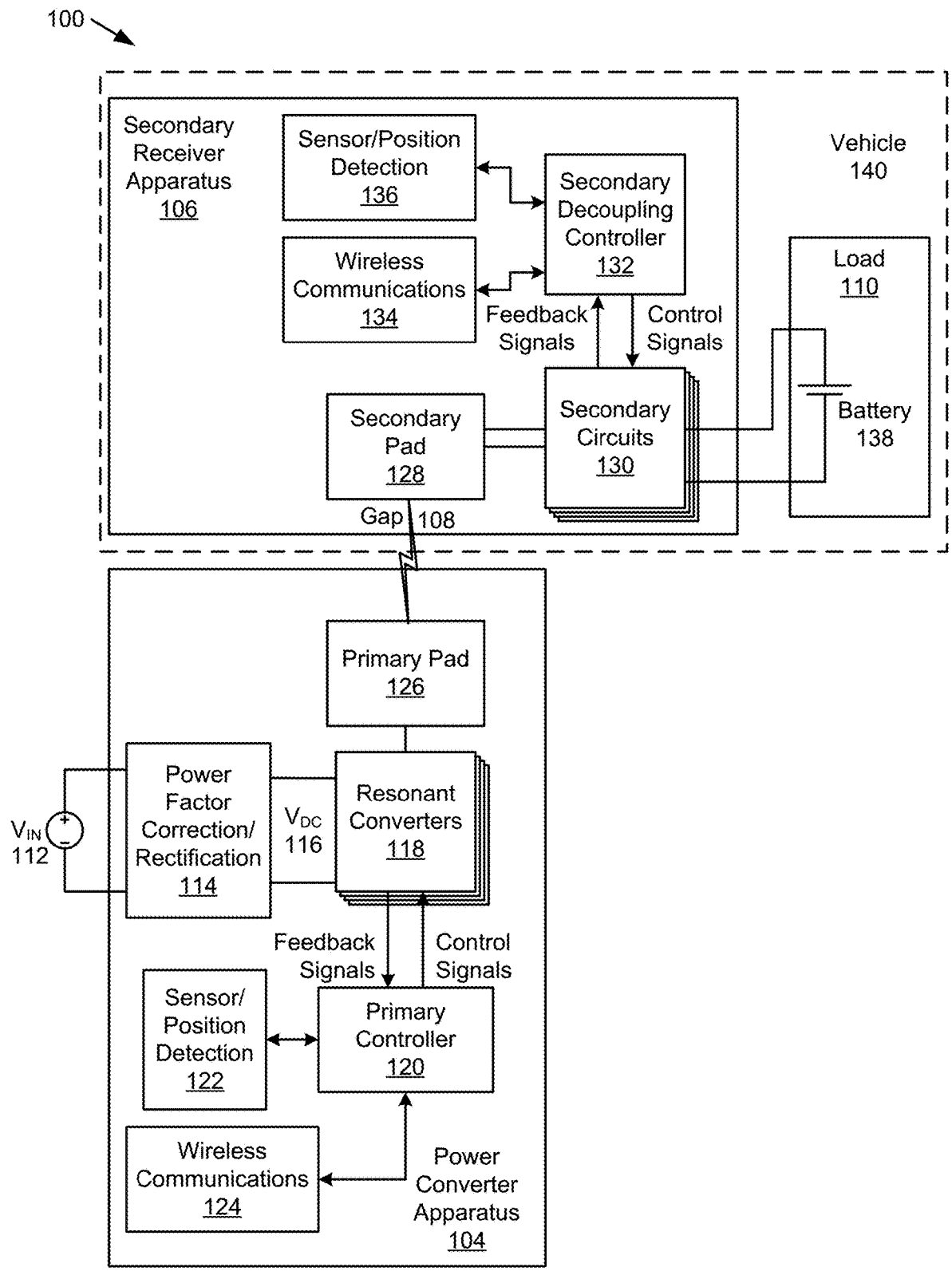
FIG. 1 is a schematic block diagram illustrating an example system with a wireless power transfer ("WPT") pad in accordance with at least one embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

FIG. 1 is a schematic block diagram illustrating one embodiment of a system with a wireless power transfer ("WPT") pad. The WPT system 100 includes a power converter apparatus 104 and a secondary receiver apparatus 106 separated by a gap 108, and a load 110, which are described below.

The WPT system 100 includes a power converter apparatus 104 that receives power from a power source 112 and transmits power over a gap 108 to a secondary receiver apparatus 106, which transfers power to a load 110. The power converter apparatus 104, in one embodiment, may be called a switching power converter and includes a resonant converter 118 that receives a direct current ("DC") voltage from a DC bus 116.

In one embodiment, the power source 112 provides DC power to the DC bus 116. In another embodiment, the power source 112 is an alternating current ("AC") power source, for example from a building power system, from a utility, from a generator, etc. and the power converter apparatus 104 includes a form of rectification to provide DC power to the DC bus 116. For example, the rectification may be in the form of a power factor correction and rectification circuit 114. In the embodiment, the power factor correction and rectification circuit 114 may include an active power factor correction circuit, such as a switching power converter. The power factor correction and rectification circuit 114 may also include a full-bridge, a half-bridge rectifier, or other rectification circuit that may include diodes, capacitors, surge suppression, etc.

The resonant converter 118 may be controlled by a primary controller 120, which may vary parameters within the resonant converter 118, such as conduction time, conduction angle, duty cycle, switching, etc. The primary controller 120 may receive information from sensors and position detection 122 within or associated with the power converter apparatus 104. The primary controller 120 may also receive information wirelessly from the secondary receiver apparatus 106.

The power converter apparatus 104 includes a primary pad 126 (i.e. a primary WPT pad) that receives power from the resonant converter 118. In some embodiments, the primary pad 126 includes two windings, three windings, four windings, etc. which are combined with a magnetic structure and the windings and magnetic structure may also be termed a "pad." In addition, each winding may include one conductor but may also include two or more conductors in parallel. A winding may include a conductive loop that includes conductive wiring configured to carry current, the conductive wiring being arranged so that it winds around an interior area. To support the windings, the power converter apparatus 104 may include multiple resonant converters 118. In one embodiment, portions of the resonant converter 118 and primary pad 126 form a resonant circuit that enables efficient wireless power transfer across the gap 108. In another embodiment, the power converter apparatus 104 includes a switching power converter that is not a resonant converter. The gap 108, in some embodiments includes an air gap, but may also may partially or totally include other substances. For example, where the primary pad 126 is in a roadway, the gap 108 may include a resin, asphalt, concrete or other material just over the windings of the primary pad 126 in addition to air, snow, water, etc. between the primary pad 126 and a secondary pad 128 located in the secondary receiver apparatus 106. In other embodiments, the gap 108 may include water where wireless power transfer occurs under water.

The secondary receiver apparatus 106 includes a secondary pad 128 (i.e. a secondary WPT pad) connected to a secondary circuit 130 that delivers power to the load 110. In the depicted embodiment, the secondary pad 128 may include multiple windings, which may also be termed "pads." Each winding may feed a separate secondary circuit 130 or a single secondary circuit 130. The secondary receiver apparatus 106 may also include a secondary decoupling controller 132 that controls the secondary circuit 130 and may also be in communication with sensors and/or position detection 136 and wireless communications 134 coupled with the power converter apparatus 104.

In one embodiment, the secondary receiver apparatus 106 and load 110 are part of a vehicle 140 that receives power from the power converter apparatus 104. The load 110 may include a battery 138, a motor, a resistive load, a circuit or other electrical load. For example, the WPT system 100 may transfer power to a portable computer, a consumer electronic device, to an industrial load, or other portable load that would benefit from receiving power wirelessly.

In one embodiment, the secondary circuit 130 includes a portion of resonant circuit that interacts with the secondary pad 128 and that is designed to receive power at a resonant frequency. In another embodiment, the secondary circuit 130 includes a power conditioning circuit that is not a resonant circuit. The secondary circuit 130 may also include a rectification circuit, such as a full-bridge rectifier, a half-bridge rectifier, and the like. In another embodiment, the secondary circuit 130 includes a power converter of some type that receives power from the resonant circuit/rectifier and actively controls power to the load 110. For example, the secondary circuit 130 may include a switching power converter. In another embodiment, the secondary circuit 130 includes passive components and power to the load 110 is controlled by adjusting power in the power converter apparatus 104. In another embodiment, the secondary circuit 130 includes an active rectifier circuit that may receive and transmit power. One of skill in the art will recognize other forms of a secondary circuit 130 appropriate for receiving power from the secondary pad 128 and delivering power to the load 110.

The resonant converter 118, in one embodiment, includes an active switching section coupled with a resonant circuit formed with components of the resonant converter 118 and the primary pad 126. The resonant converter 118 is described in more detail with regard to FIGS. 2A-2D.

Figure 2A:
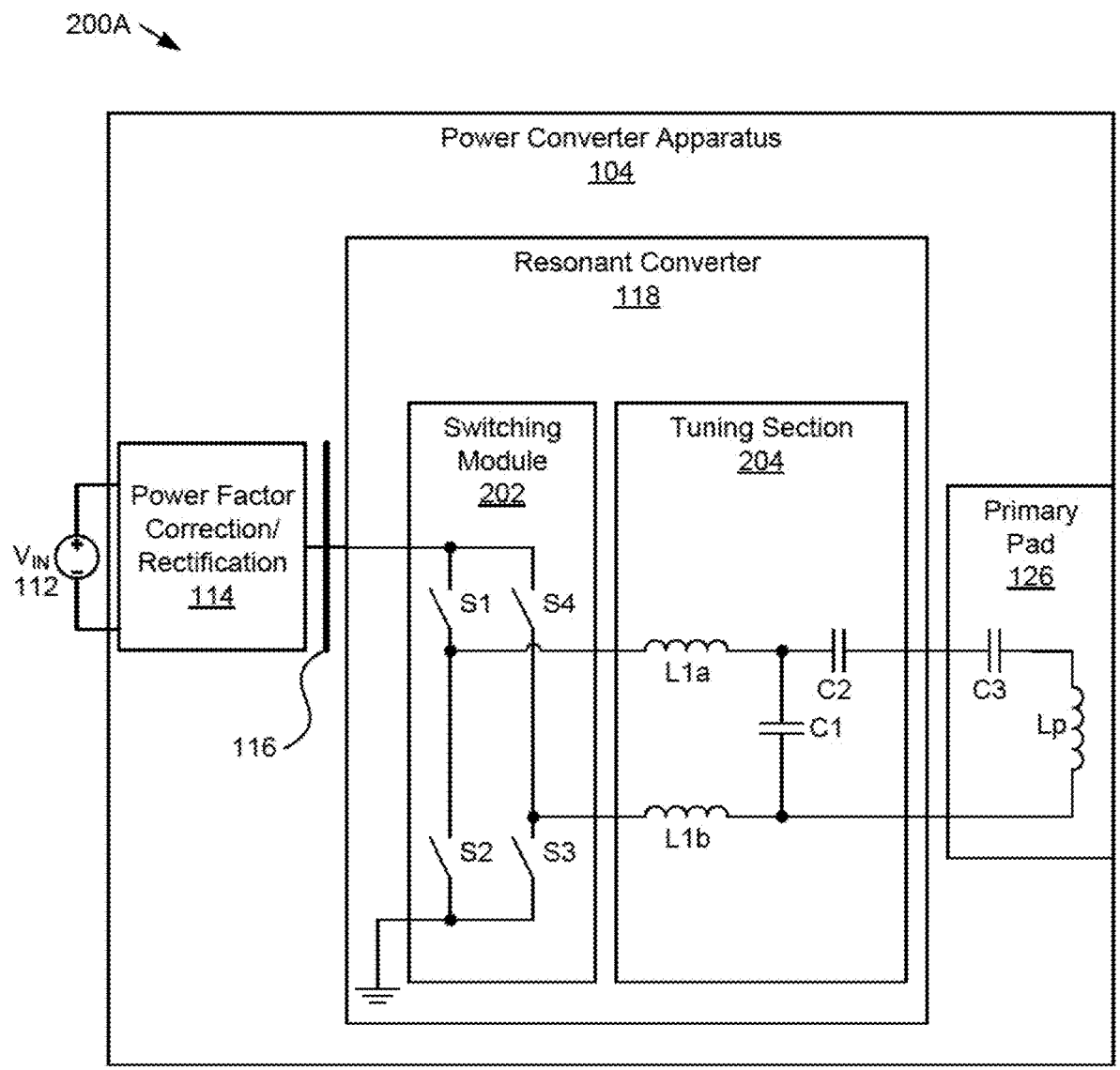
FIG. 2A is a schematic block diagram illustrating an example power converter apparatus in accordance with at least one embodiment.

FIG. 2A is a schematic block diagram illustrating one embodiment 200A of a power converter apparatus 104. The power converter apparatus 104 is connected to a power source 112 and includes a power factor correction and rectification circuit 114 connected to a DC bus 116 feeding a resonant converter 118 connected to a primary pad 126 as described with regard to the WPT system 100 of FIG. 1.

The resonant converter 118 includes a switching module 202 and a tuning section 204. In one embodiment, the switching module 202 includes four switches configured to connect the DC bus 116 and to ground. Typically, switches S1 and S3 close while switches S2 and S4 are open and vice-versa. When switches S1 and S3 are closed, the DC bus 116 is connected to a positive connection of the tuning section 204 through inductor L1a and the ground is connected to the negative connection of the tuning section 204 through inductor L1b while switches S2 and S4 are open. When switches S2 and S4 are closed, the ground is connected to the positive terminal of the tuning section 204 and the DC bus 116 is connected to the positive connection of the tuning section 204. Thus, the switching module alternates connection of the DC bus 116 and ground to the tuning section 204 simulating an AC waveform. The AC waveform is typically imperfect due to harmonics.

Typically, switches S1-S4 are semiconductor switches, such as a metal-oxide-semiconductor field-effect transistor ("MOSFET"), a junction gate field-effect transistor ("JFET"), a bipolar junction transistor ("BJT"), an insulated-gate bipolar transistor ("IGBT") or the like. Often the switches S1-S4 include a body diode that conducts when a negative voltage is applied. In some embodiments, the timing of opening and closing switches S1-S4 are varied to achieve various modes of operations, such as zero-voltage switching.

The tuning section 204 of the resonant converter 118 and the primary pad 126 are designed based on a chosen topology. For example, the resonant converter 118 and primary pad 126 may form an inductor-capacitor-inductor ("LCL") load resonant converter, a series resonant converter, a parallel resonant converter, and the like. The embodiment depicted in FIG. 2A includes an LCL load resonant converter.

Resonant converters include an inductance and capacitance that form a resonant frequency. When a switching frequency of the tuning section 204 is at or close to the resonant frequency, voltage with the tuning section 204 and primary pad 126 often increases to voltages levels higher than the voltage of the DC bus 116. For example, if the voltage of the DC bus 116 is 1 kilovolt ("kV"), voltage in the tuning section 204 and resonant converter 118 may be 3 kV or higher. The high voltages require component ratings, insulation ratings, etc. to be high enough for expected voltages.

The primary pad 126 includes capacitor C3 and inductor Lp while the tuning section 204 includes series capacitor C2. Capacitors C2 and C3 add to provide a particular capacitance that forms a resonant frequency with inductor Lp. In some embodiments, the power converter apparatus 104 includes a single series capacitor in the tuning section 204 or in the primary pad 126. While FIG. 2A is focused on the resonant converter 118 and primary pad 126, the secondary receiver apparatus 106 includes a secondary pad 128 and a secondary circuit 130 that typically includes a tuning section 204 where the inductance of the secondary pad 128 and capacitance of the tuning section 204 of the secondary circuit 130 form a resonant frequency and the secondary pad 128 and secondary circuit 130 have voltage issues similar to the primary pad 126 and resonant converter 118. In other embodiments, the tuning section 204 and primary pad 126 are not designed to produce a resonance, but instead condition voltage from the switching module 202. For example, the tuning section 204 may filter out harmonic content without filtering a switching frequency.

Figure 2B:
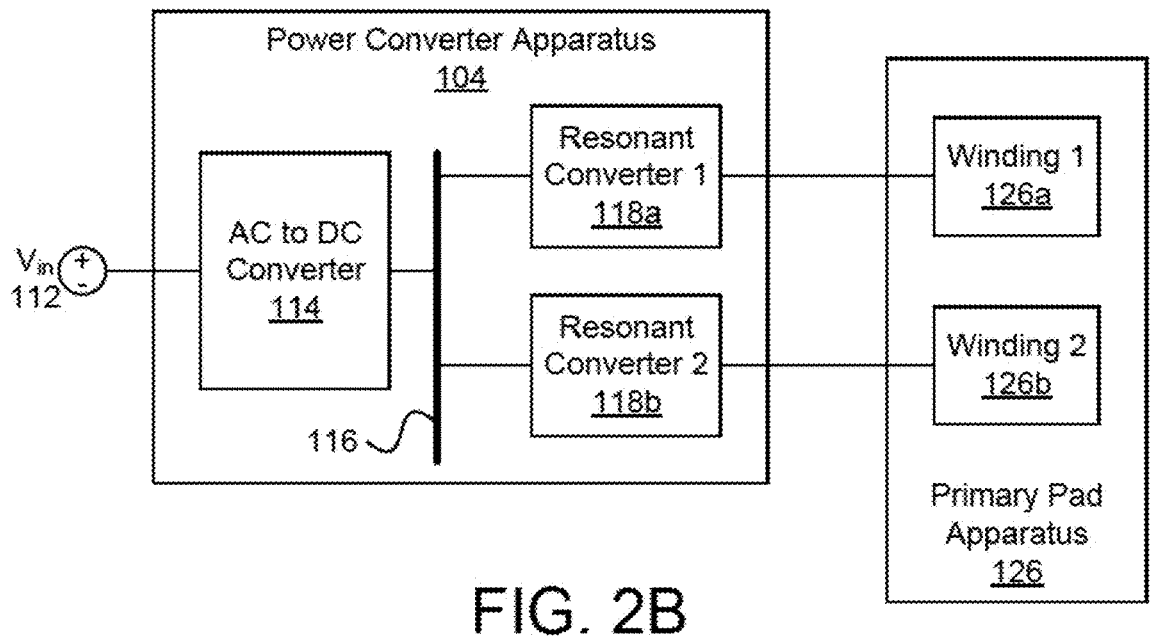
FIG. 2B is a schematic block diagram illustrating an example power converter apparatus with two resonant converters feeding windings of one or more WPT pads in accordance with at least one embodiment.

FIG. 2B is a schematic block diagram illustrating one embodiment 200B of a power converter apparatus 104 with two resonant converters 118a-b feeding windings 1216a-b of one or more WPT pads 126. FIG. 2B is a schematic block diagram illustrating one embodiment 201 of a power converter apparatus 104 with two resonant converters 118a-b feeding windings 126a-b of one or more primary pads 126. FIG. 2B is presented in a one-line diagram format. One of skill in the art will recognize that each line between elements represents two or more conductors. The power source 112, power factor correction and rectification circuit 114 and DC bus 116 are substantially similar to those described in the embodiment 200A of FIG. 2A. The power converter apparatus 104 includes two resonant converters 118a-b (generically or individually "118") where each resonant converter 118 includes a switching module 202 and may include a tuning section 204. Each resonant converter 118 feed a winding (e.g. 126a) of a primary pad 126, which may include multiple windings 126a-b. A resonant converter (e.g. 118a) may feed an individual primary pad 126. The primary pad 126 may include a magnetic structure with vertical sections, as depicted in FIG. 4, 5 or 9A-9C or may include a biplane WPT pad as depicted in FIG. 4, 5, or 6A-6C where the biplane WPT pad is a primary pad 126 and the secondary pad 128 is a WPT pad with vertical sections.

Figure 2C:
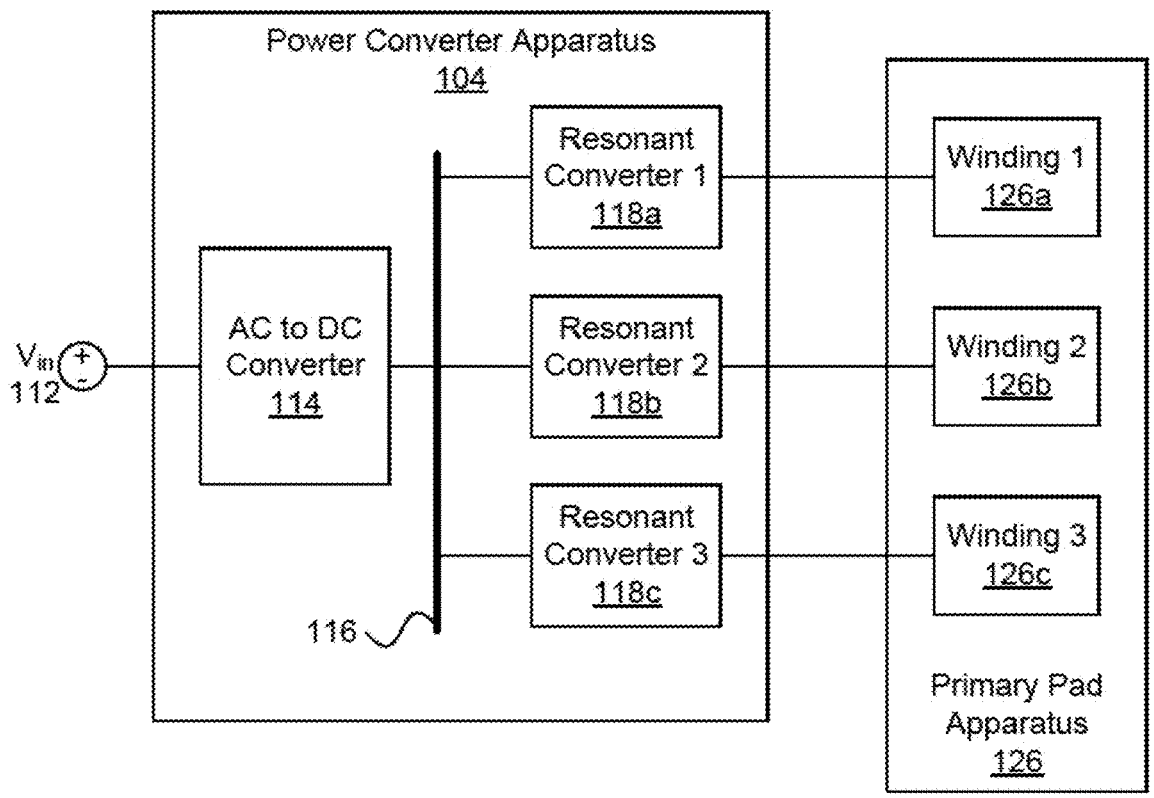
FIG. 2C is a schematic block diagram illustrating an example power converter apparatus with three resonant converters feeding windings of one or more WPT pads in accordance with at least one embodiment.
Figure 13:
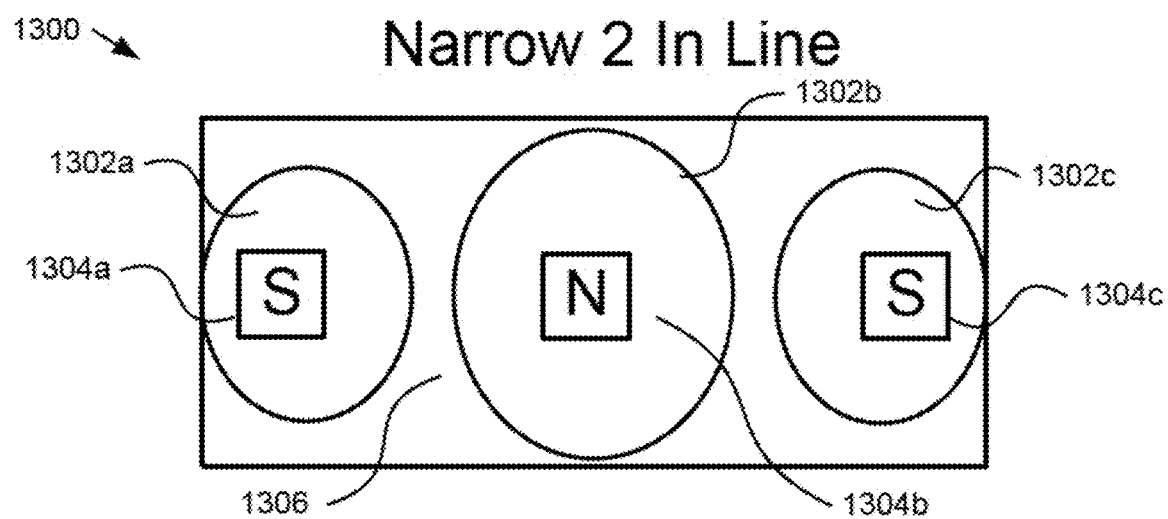
FIG. 13 is a schematic block diagram illustrating an example biplane WPT pad with an in-line structure and three windings with three side sections in accordance with at least one embodiment.
Figure 14:
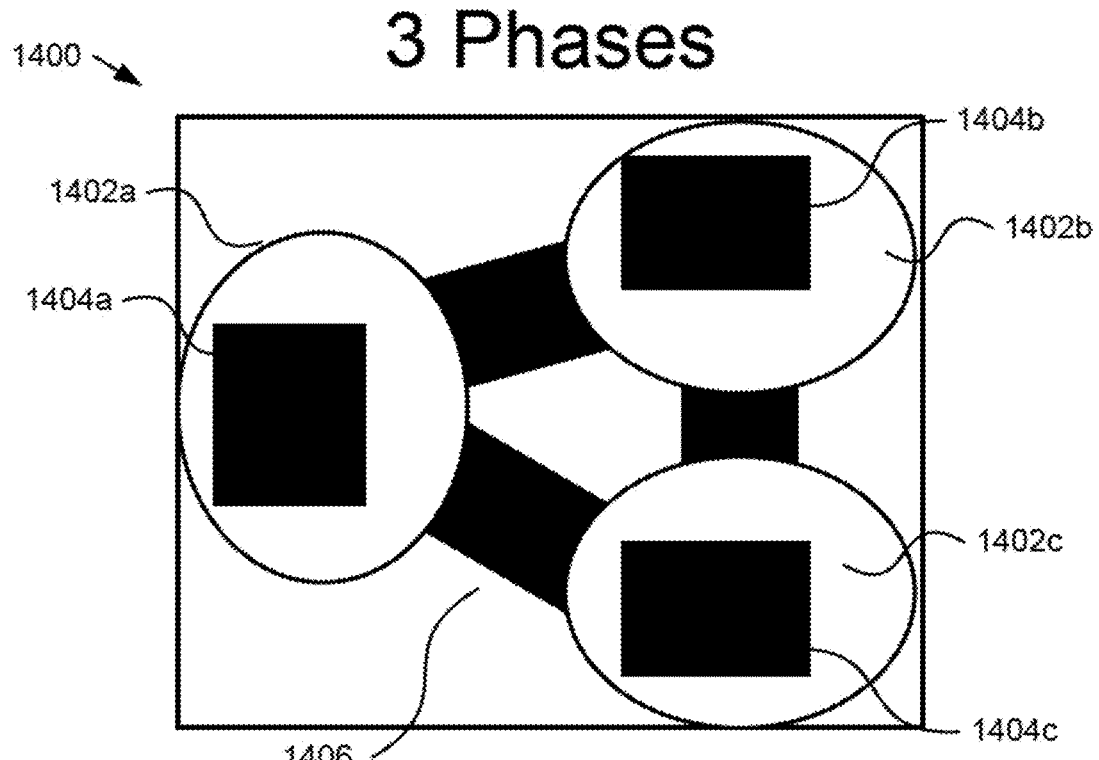
FIG. 14 is a schematic block diagram illustrating a biplane WPT pad with a triangular structure and three windings with three side sections in accordance with at least one embodiment.

FIG. 2C is a schematic block diagram illustrating one embodiment 200C of a power converter apparatus 104 with three resonant converters 118a-c feeding three windings 126a-c of one or more WPT pads 126. The embodiment 200C is substantially similar to the power converter apparatus 104 of FIG. 2B except with three resonant converters 118a-c and windings 126a-c instead of two. In some embodiments, the resonant converters 118a-c produce waveforms that are offset by 120 degrees, which produces a ripple in the primary pad 126 that is minimized due to cancelling effects caused by offset of the waveforms from the resonant converters 118a-c. Possible implementations of the primary pad 126 as a biplane WPT are depicted in FIGS. 13 and 14.

Figure 2D:
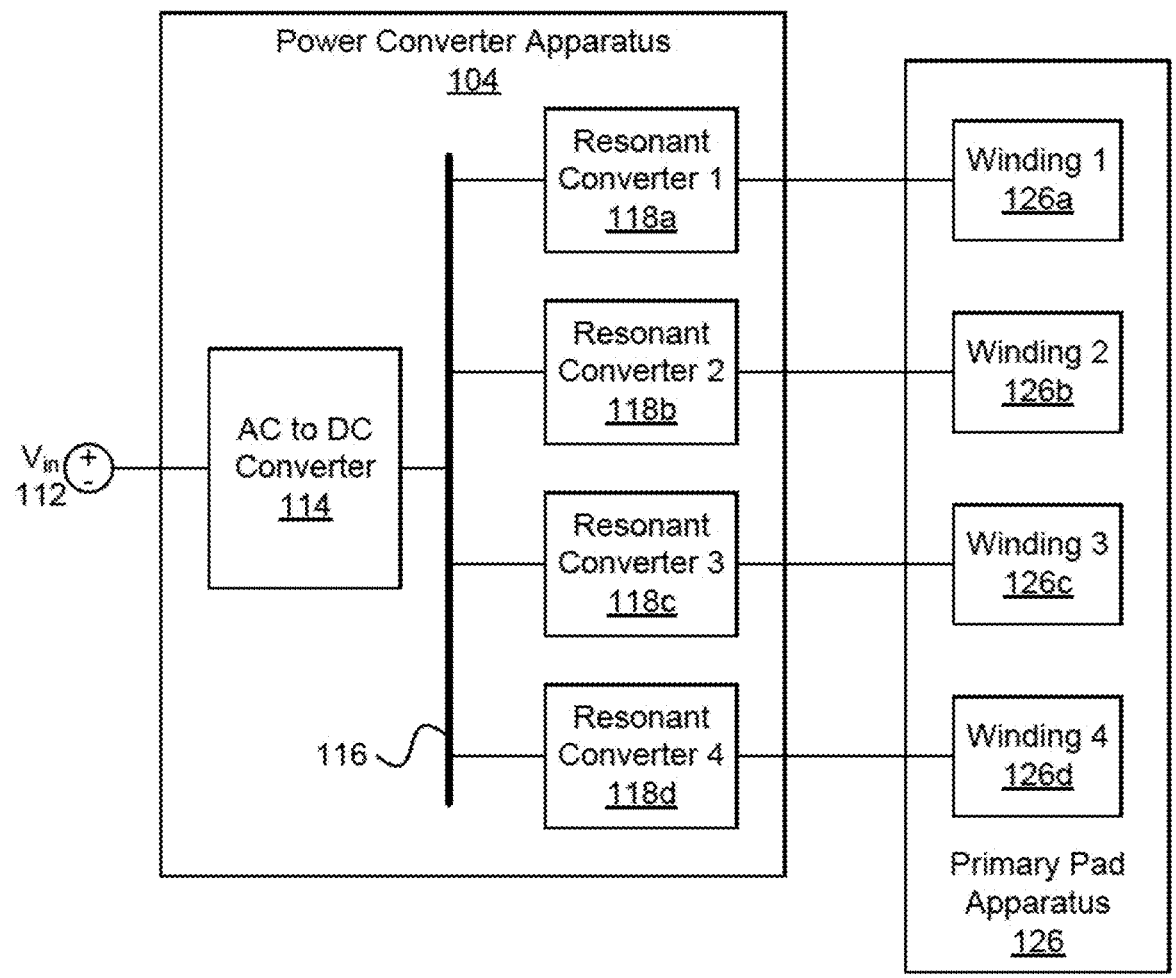
FIG. 2D is a schematic block diagram illustrating an example power converter apparatus with four resonant converters feeding windings of one or more WPT pads in accordance with at least one embodiment.
Figure 15:
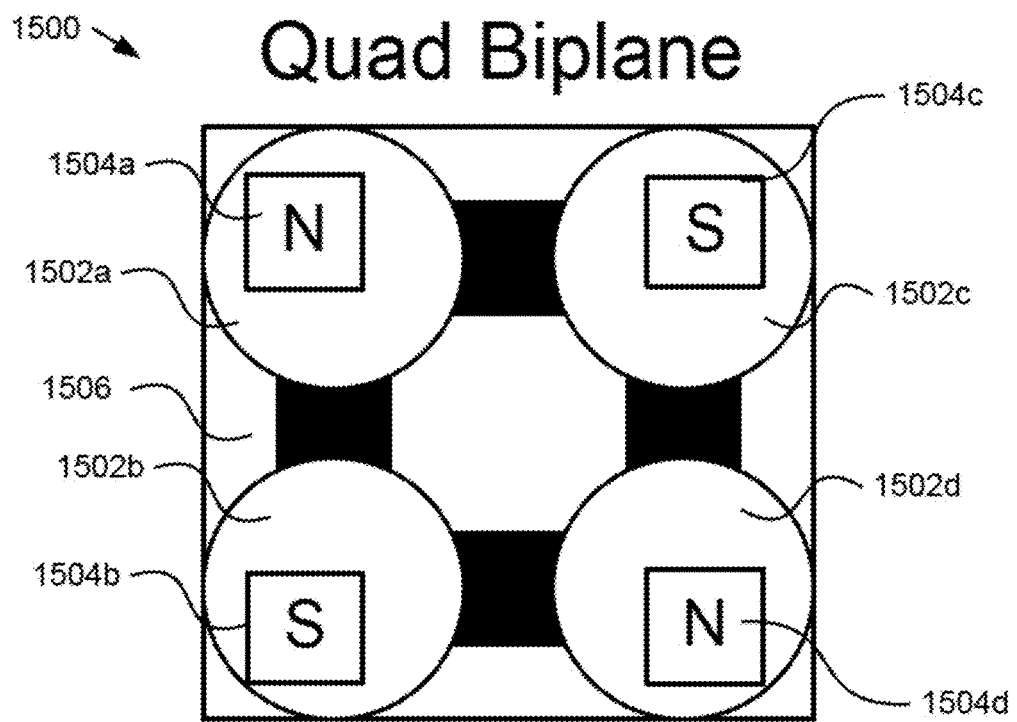
FIG. 15 is a schematic block diagram illustrating a first a biplane WPT pad with a square structure and four windings with four side sections where the polarity is north-south-north-south in accordance with at least one embodiment.
Figure 16:
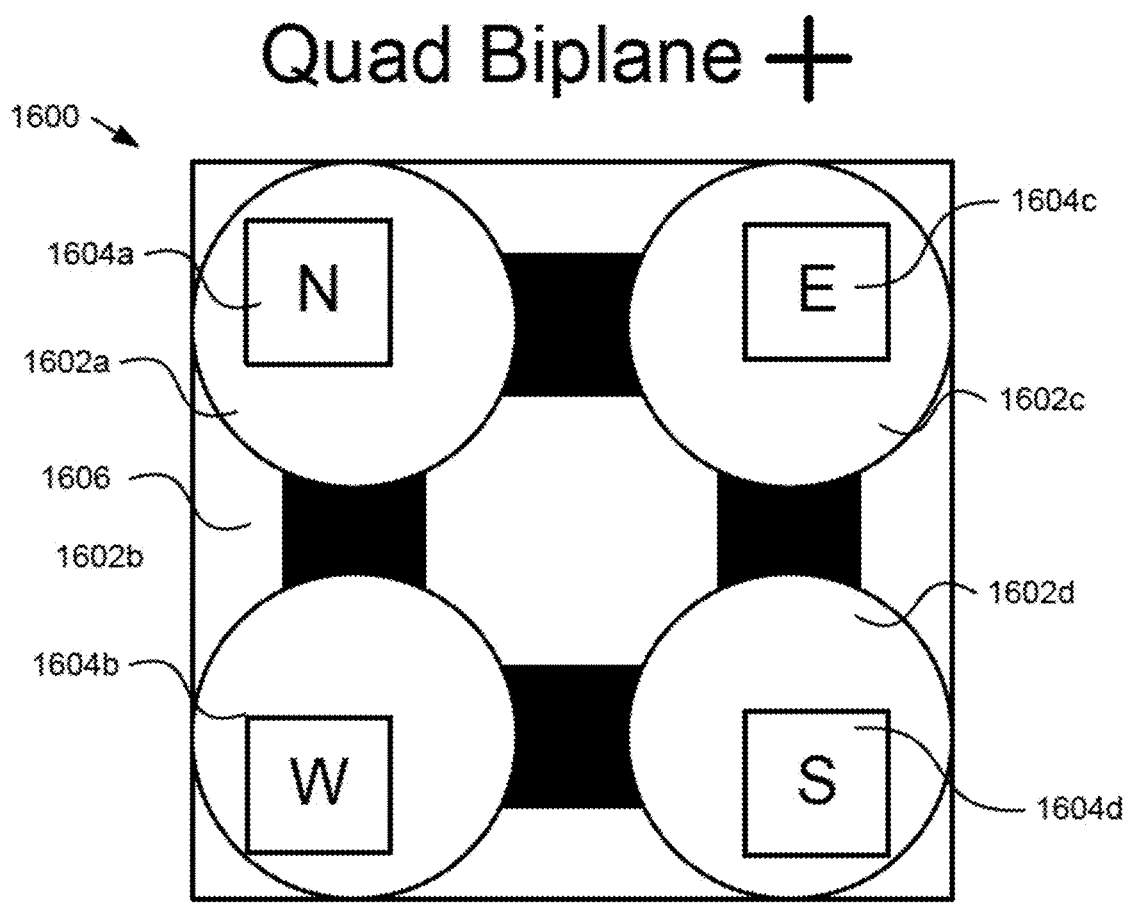
FIG. 16 is a schematic block diagram illustrating a second quad a biplane WPT pad with a square structure and four windings with four side sections where power to each side section is offset by 90 degrees in accordance with at least one embodiment.

FIG. 2D is a schematic block diagram illustrating one embodiment 200D of a power converter apparatus 104 with four resonant converters 118a-d feeding four windings 126a-d of one or more WPT pads 126. The embodiment 200D is substantially similar to the power converter apparatuses 104 of FIG. 2B or 2C except with four resonant converters 118a-d and windings 126a-d instead of two or three. In some embodiments, the resonant converters 118a-d produce waveforms that are offset by 90 degrees, which produces a ripple in the primary pad 126 that is minimized due to cancelling effects caused by offset of the waveforms from the resonant converters 118a-d. One possible implementation of the primary pad 126 as a biplane WPT pad is depicted in FIG. 16. In another embodiment, two windings (e.g. 126a, 126c) have the same polarity and two windings (e.g. 126b, 126d) have an opposite polarity as the other two windings 126a, 126c. Possible implementations of the primary pad 126 as a biplane WPT pad are depicted in FIGS. 15 and 16.

Figure 3A:
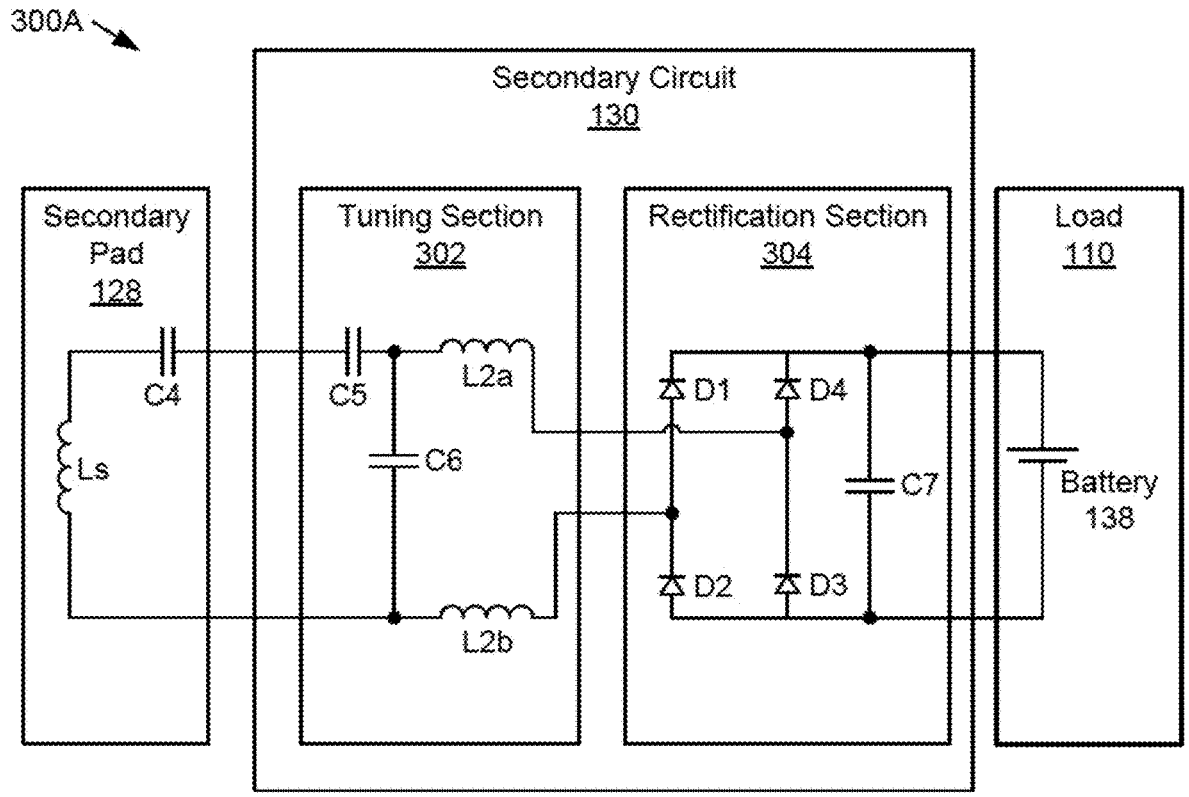
FIG. 3A is a schematic block diagram illustrating an example secondary circuit feeding a load in accordance with at least one embodiment.

FIG. 3A is a schematic block diagram illustrating one embodiment 300A of a secondary circuit 130 feeding a load 110. A secondary pad 128 feeds a tuning section 302 within the secondary circuit 130 and the tuning section 302 feeds a rectification section 304 in the secondary circuit 130, which feeds a load 110.

The secondary pad 128 includes one or more windings arranged to receive power from a primary pad 126. The secondary pad 128 may include a magnetic structure and windings arranged in a pattern that efficiently receives power from the primary pad 126. In one embodiment, the secondary pad 128 mirrors the primary pad 126 transmitting power. In another embodiment, the secondary pad 128 differs from the primary pad 126. For example, the primary pad 126 and secondary pad 128 may be in the form of a WPT pad with vertical sections and a biplane WPT pad as described below. Typically, the secondary pad 128 includes an inductance Ls formed as a result of the windings and the magnetic structure of the secondary pad 128. In one embodiment, the secondary pad 128 includes a capacitor C4. In some embodiments, the secondary pad 128 includes multiple windings with associated inductances Ls and capacitors Cs arranged in parallel or series.

The tuning section 302 includes one or more capacitors C5, C6 and inductors L2a, L2b that are arranged to form a resonant circuit with the secondary pad 128 with a resonant frequency. In some embodiments, capacitor C6 is not present. In one embodiment, the resonant frequency matches a resonant frequency of the primary pad 126 transmitting power. Typically, a resonant frequency is formed between the inductor Ls of the secondary pad 128 and series capacitors C4 and C5 of the secondary pad 128 and/or tuning section 302. In some embodiments, the secondary pad 128 or the tuning section 302 include a single series capacitor C4 or C5. Other capacitors (e.g. C6) and inductors (e.g. L2a, L2b) may form a low pass filter to reduce voltage ripple at the resonant frequency. In other embodiments, a low-pass filter is included after rectification elements in the rectification section 304. For example, a capacitor C7 may be included. One of skill in the art will recognize other configurations of the tuning section 302 that form a resonant tank with the secondary pad 128 and pass energy to the rectification section 304 or another suitable circuit. In other embodiments, the secondary pad 128 does not transfer power at or near a resonant frequency and the inductances and capacitances differ from the secondary pad 128 and tuning section 302 depicted.

A rectification section 304 includes diodes, switches, or other rectification elements to convert alternating current ("AC") power to direct current ("DC") power. The rectification section 304 depicted in FIG. 3 includes a full bridge rectifier with four diodes D1-D4. In some embodiments, the diodes D1-D4 are replaced with active elements, such as switches, which may be used to reduce harmonics, reduce power consumption, and the like. For example, the rectification section 304 may include a switching power converter that controls an output voltage to the load 110.

The load 110, in one embodiment is a battery 138. In other embodiments, the load 110 may include other components, such as a motor, a resistive load, electronics, and the like. In one embodiment, the secondary pad 128, secondary circuit 130 and load 110 are part of a vehicle 140. In other embodiments, the secondary pad 128, secondary circuit 130 and load 110 are part of a computing device, a smartphone, and the like.

Figure 3B:
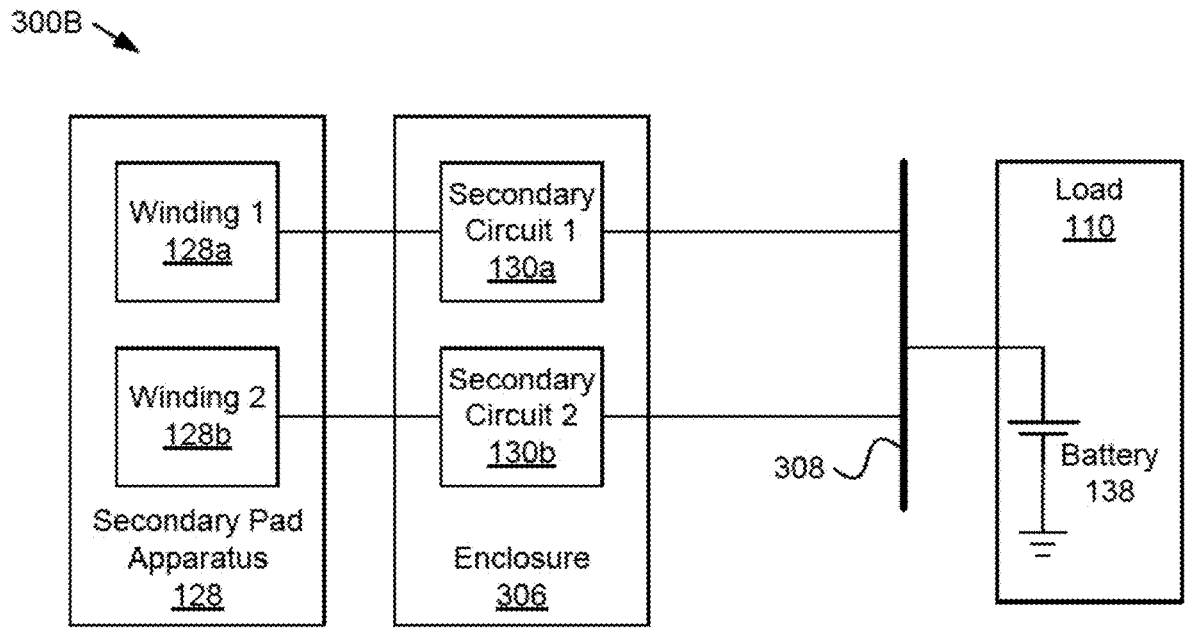
FIG. 3B is a schematic block diagram illustrating an example of two windings of a secondary pad feeding two secondary circuits, which feed a load in accordance with at least one embodiment.

FIG. 3B is a schematic block diagram illustrating one embodiment 300B of two windings 128a-b of a secondary pad 128 feeding two secondary circuits 130a-b, which feed a load 110. The secondary circuits 130a-b, in one embodiment, may be in one or more enclosures 306 and feed a secondary DC bus 308, which feeds the load 110. A secondary pad 128 with two windings 128a-b is advantageous to increase power output and two windings 128a-b may also be used in determining alignment. The secondary pad 128, in some embodiments, is similar to the biplane WPT pad depicted in FIGS. 4, 5 and 6A-C and variants but might also be a WPT pad with vertical sections as depicted in FIGS. 4, 5 and 9A-C.

Figure 3C:
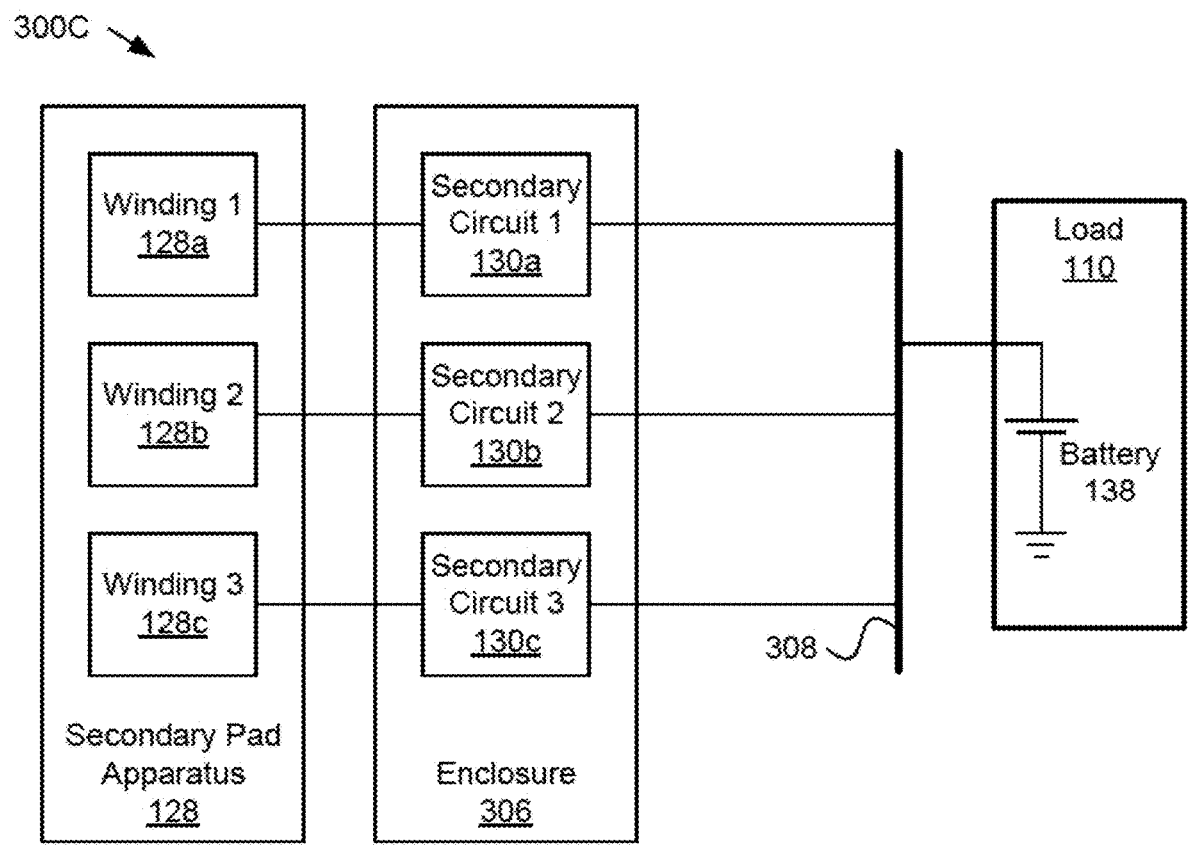
FIG. 3C is a schematic block diagram illustrating an example of three windings of a secondary pad feeding three secondary circuits, which feed a load in accordance with at least one embodiment.

FIG. 3C is a schematic block diagram illustrating one embodiment 300C of three windings 128a-c of a secondary pad 128 feeding three secondary circuits 130a-c, which feed a load 110. As with the embodiment 300B of FIG. 3B, the secondary circuits 130a-c, in one embodiment, may be in one or more enclosures 306 and feed a secondary DC bus 308, which feeds the load 110. A secondary pad 128 with three windings 128a-c is advantageous to be used in a three-phase circuit to increase power output and to decrease noise due to the ripple cancelling effects of three-phase power. The secondary pad 128, in some embodiments, is similar to the biplane WPT pad depicted in FIG. 14 and variants but might also be a WPT pad with vertical sections.

Figure 3D:
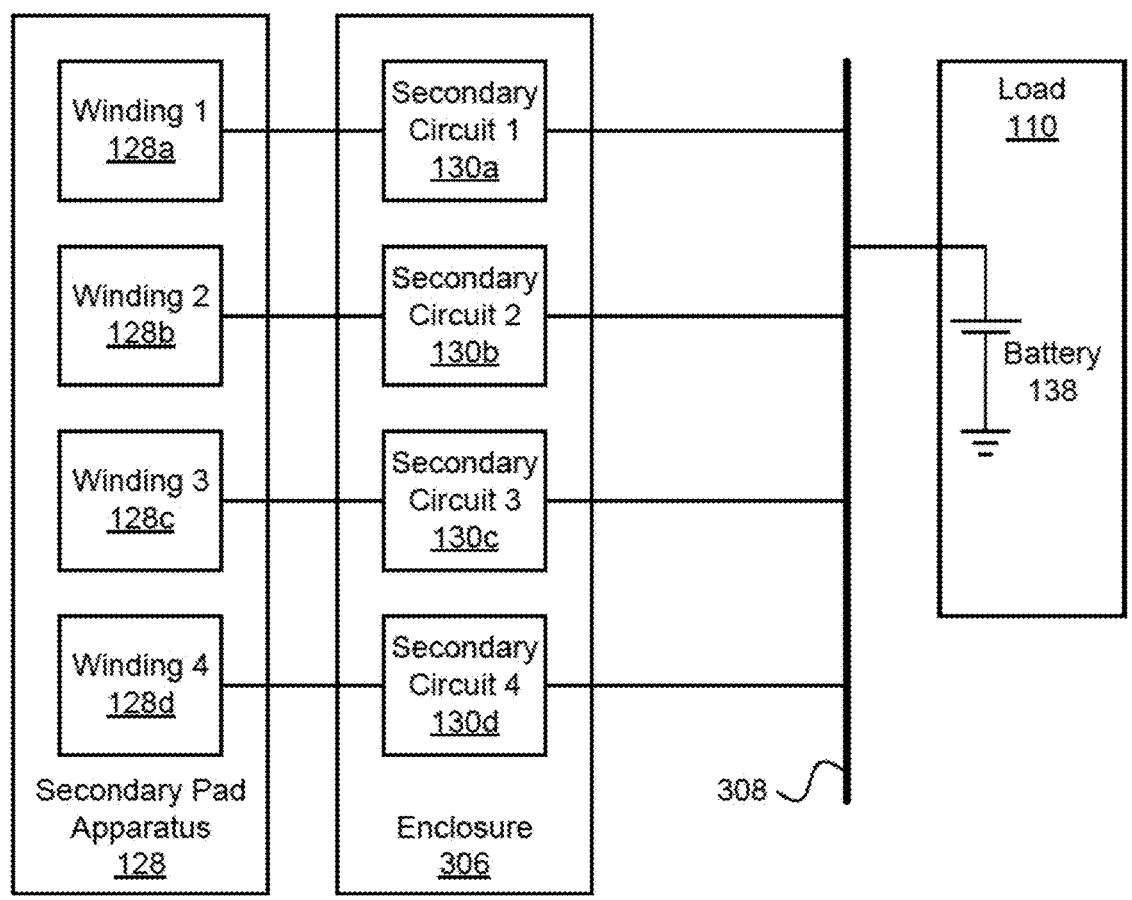
FIG. 3D is a schematic block diagram illustrating an example of four windings of a secondary pad feeding four secondary circuits, which feed a load in accordance with at least one embodiment.

FIG. 3D is a schematic block diagram illustrating one embodiment 300D of four windings 128a-d of a secondary pad 128 feeding four secondary circuits 130a-d, which feed a load 110. As with the embodiment 300B of FIG. 3B, the secondary circuits 130a-d, in one embodiment, may be in one or more enclosures 306 and feed a secondary DC bus 308, which feeds the load 110. A secondary pad 128 with four windings 128a-d is advantageous to be used in a single-phase or four-phase system to increase power output and to decrease noise due to ripple cancelling effects of offset waveforms. The secondary pad 128, in some embodiments, is similar to the biplane WPT pad depicted in FIGS. 15 and 16 and variants but might also be a WPT pad with vertical sections.

Figure 4:
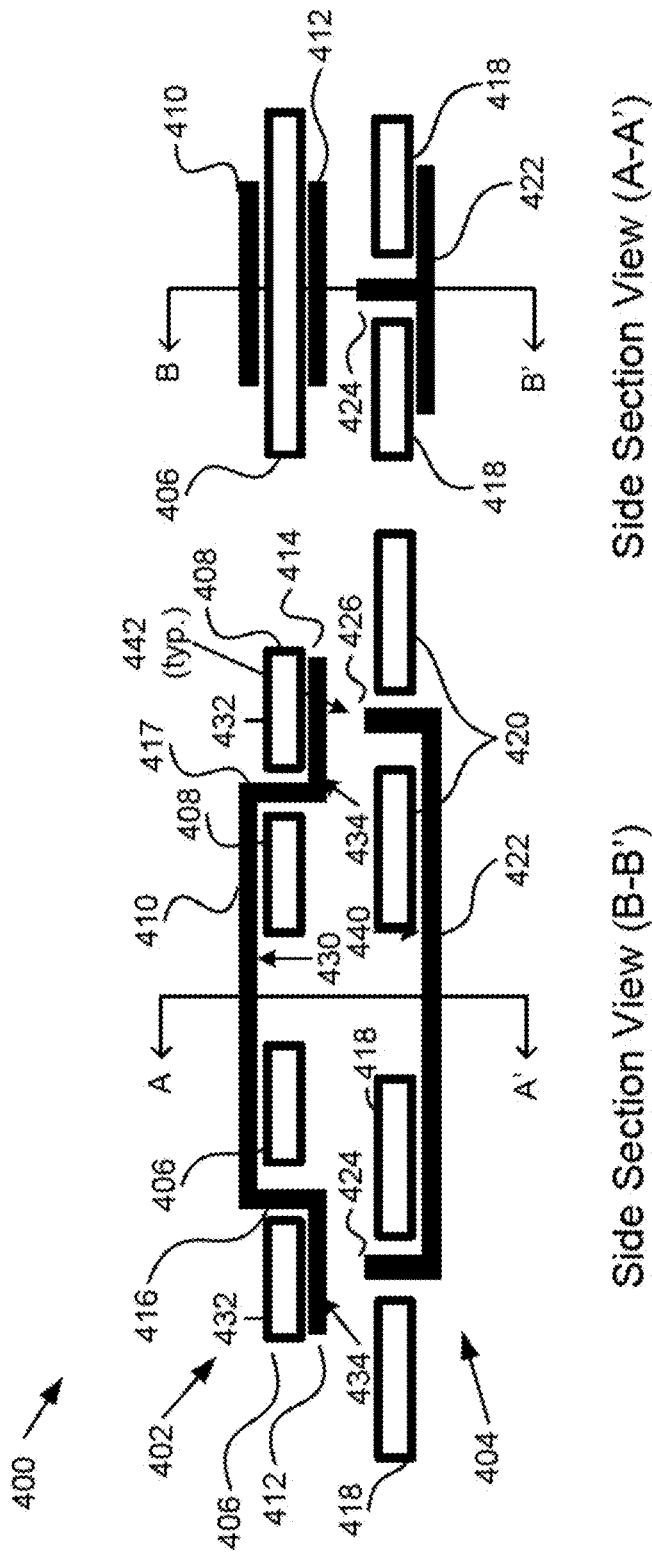
FIG. 4 is a schematic block diagram illustrating a side section view and an end section view of an example biplane WPT pad as a secondary WPT pad with two windings over a two winding WPT pad with vertical sections as a primary WPT pad in accordance with at least one embodiment.

FIG. 4 is a schematic block diagram 400 illustrating a side section view and an end section view of a first WPT pad 402, which is a biplane WPT pad 402 functioning as a secondary WPT pad 128 with two windings over a second WPT pad 404, which is a two winding WPT pad 404 with a first vertical section 424 and a second vertical section 426 functioning as a primary WPT pad 126. The biplane WPT pad 402 is depicted on top includes a first winding 406 and a second winding 408 where the first and second windings 406, 408 include conductors. In some embodiments, the first and second windings 406, 408 are connected to each other. In some embodiments, the first winding 406 is wound to create an opposite polarity as the second winding 408, which provides that the second winding 408 is a north pole and the first winding 406 is a south pole, or vice-versa. The biplane WPT pad 402 includes a first magnetic structure that includes a first main section 410 with a winding facing side 430, a first side section 412 and a second side section 414. The side sections 412, 414 each include a winding facing side 432 and a non-winding facing side 434. The non-winding facing sides 434 of the first and second side sections 412, 414, in some embodiments, are in a common plane.

The first winding 406 is wound so at least a portion is adjacent to the winding facing side 430 of the first main section 410 and a portion is adjacent to the winding facing side 432 of the first side section 412. The second winding 408 is wound so at least a portion is adjacent to the winding facing side 430 of the first main section 410 and adjacent to the winding facing side 432 of the second side section 414.

In some embodiments, the first and second side sections 412, 414 are considered vertical sections and are adjacent to the first main section 410. In other embodiments, the first and second side sections 412, 414 are separated from the first main section 410 by a first vertical section 416 and a second vertical section 417 respectively, as depicted in FIG. 4. The first and second side sections 412, 414 advantageously have a planar section that face third and fourth vertical sections 424, 426 of the second WPT pad 404, which facilitates easier alignment. In some embodiments, the first vertical section 416 crosses through an open center (e.g., any area in the interior of the winding) of the first winding 406 and the second vertical section 417 crosses through an open center of the second winding 408 creating a magnetic path through the centers of the first and second windings 406, 408. The biplane WPT pad 402 is discussed in more detail with respect to FIGS. 6A-6C.

The second WPT pad 404 includes a third winding 418 and a fourth winding 420. The third and fourth windings 418, 420 include conductors and are connected to each other. In some embodiments, the third winding 418 is wound to create and opposite polarity as the fourth winding 420, which provides that the third winding 418 is a south pole and the fourth winding 420 is a north pole, or vice-versa.

The second WPT pad 404 includes a second magnetic structure that includes a second main section 422 with a winding facing side 440, a third vertical section 424 and a fourth vertical section 426. The third and fourth vertical sections 424, 426 each extend away from the winding facing side 440 of the second main section and, in some embodiments, the third and fourth vertical sections 424, 426 include a planar end 442 parallel to each other and to the winding facing side 440 of the second main section 422. The third winding 418 is wound around the third vertical section 424 and the fourth winding 420 is wound around the fourth vertical section 426. In some embodiments, a third vertical section 424 crosses through an open center of the third winding 418 and the fourth vertical section 417 crosses through an open center of the fourth winding 420 creating a magnetic path through the centers of the third and fourth windings 418, 420.

The first and second WPT pads 402, 404 are configured to transfer power wirelessly over a gap between each other and the planar end 442 of the third and fourth vertical sections 424, 426 have a surface area smaller than the non-winding facing side 434 of the first and second side sections 412, 414. Typically, the planar ends 442 of the third and fourth vertical sections 424, 426 are small enough compared to the non-winding facing side 434 of the first and second side sections 412, 414 to allow for misalignment while maintaining a fairly consistent mutual coupling when the planar ends 442 of the third and fourth vertical sections 424, 426 are within an area bounded by the outside edges of the non-winding facing side 434 of the first and second side sections 412, 414.

In some embodiments, a distance between a center of the first side section 412 and a center of the second side section 414 matches a distance between a center of the first vertical section 424 and the second vertical section 426, which further enables better alignment of the first WPT pad 402 and the second WPT pad 404. Note that while the first WPT pad 402 is depicted as a secondary WPT pad 128 and the second WPT pad 404 is depicted as a primary WPT pad 126, the first and second WPT pads 402, 404 can be reversed. One advantage of having the first WPT pad 402, which is a biplane WPT pad 402 as a secondary WPT pad 128 is that the biplane WPT pad 402 in some instances has a lower profile than the second WPT pad 404 with third and fourth vertical sections 424, 426, which may be advantageous when mounting on a vehicle. A reason for the second WPT pad 404 to be a secondary WPT pad 128 is that in some instances the second WPT pad 404 with third and fourth vertical sections 424, 426 may have less magnetic material than a biplane WPT pad 402 and may be lighter than the biplane WPT pad 402.

In some embodiments, the first vertical section 416 and the second vertical section 417 are placed on opposite edges of the first main section 410 and the third vertical section 424 and the fourth vertical section 426 are placed on opposite edges of the second main section 422. In some embodiments, the first and second side sections 412, 414 each connect to the first and second vertical sections 416, 418 at an edge of the first and second side sections 412, 414 and the first and second side sections 412, 414 extend in a direction away from the first main section 410. Thus, magnetic material of the main sections 410, 422 does not extend past the vertical sections 416, 418, 424, 426. Also, the first and second side sections 412, 414 do not have magnetic material extending inward past the first and second vertical sections 416, 418, which helps to direct electromagnetic flux directly from the first side section 412 to the second side section 414 and from the fourth vertical section 426 to the third vertical section 424 with less leakage past the intended electromagnetic flux pathways.

It should be noted that FIG. 4 depicts two magnetic structures that are each made up of a respective main section, two or more vertical sections, and (in some cases) side sections. Each of the respective magnetic structures may pass through the openings of a set of windings, resulting in the formation of two solenoids made up of the respective magnetic structures and windings.

Figure 5:
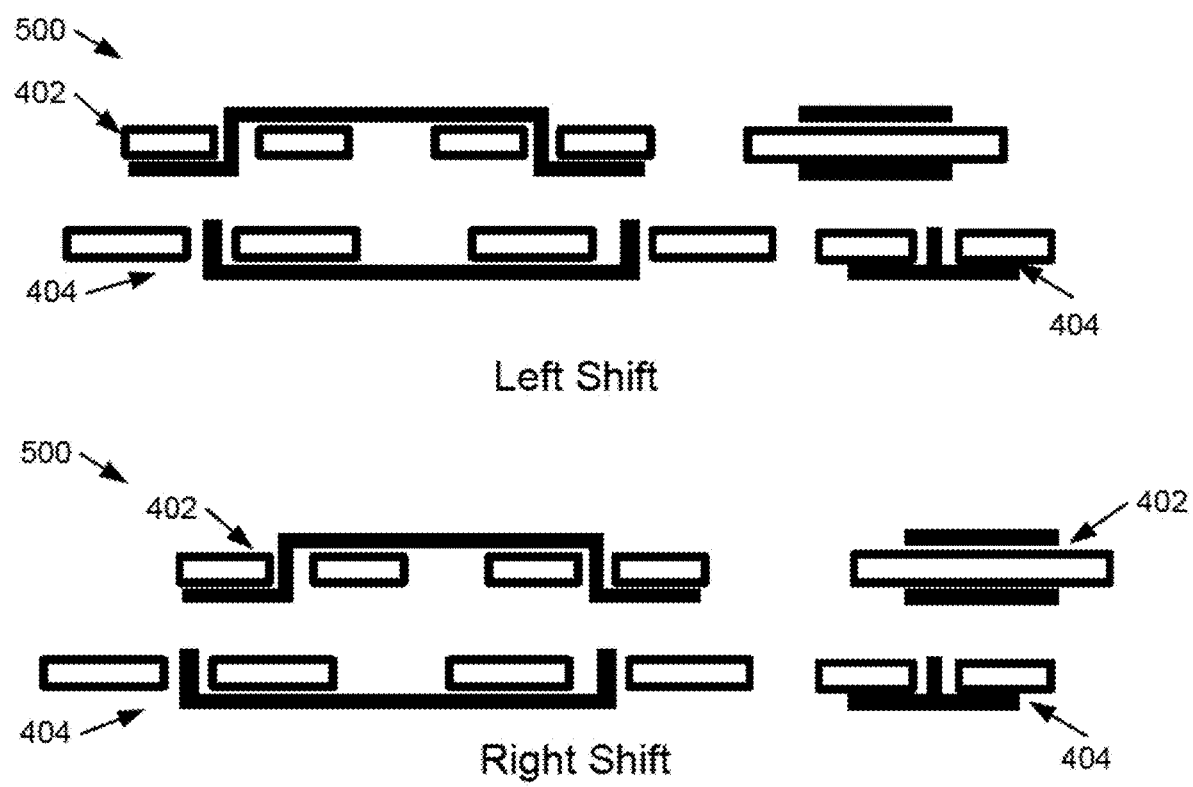
FIG. 5 is a schematic block diagram illustrating a side section view and an end section view of the biplane WPT pad over the two winding WPT pad with vertical sections of FIG. 4 where the biplane WPT pad is shifted left and shifted right in accordance with at least one embodiment.

FIG. 5 is a schematic block diagram illustrating a side section view and an end section view of the first WPT pad 402, which is a biplane WPT pad 402 over the second WPT pad 404, which is a two winding WPT pad with third and fourth vertical sections 424, 426 of FIG. 4 where the biplane WPT pad 402 is shifted left and shifted right. Shifting of the biplane WPT pad 402 to the right or left with respect to the third and fourth vertical sections 424, 426 of the second WPT pad 404 while maintaining the side sections 412, 414 within a footprint of the side sections 412, 414 advantageously provides a mostly even mutual coupling. Shifting the biplane WPT pad 402 further so the side sections 412, 414 are outside of the footprint of the third and fourth vertical sections 424, 426 reduces mutual coupling more than when the side sections 412, 414 are over the third and fourth vertical sections 424, 426. The greater the difference between the areas of the side sections 412, 414 compared to an area of the planar ends 442 of the third and fourth vertical sections 424, 426 the larger amount of movement of the biplane WPT pad 402 with respect to the second WPT pad 404 with third and fourth vertical sections 424, 426 while maintaining a fairly constant mutual coupling. However, a surface area of the planar ends 442 of the third and fourth vertical sections 424, 426 is constrained by an amount of power to be transferred between the WPT pads 402, 404. The area of the side sections 412, 414 of the biplane WPT pad 402 is also constrained by various conditions as well, such as area under a vehicle, weight, amount of power to be transferred, winding size, etc.

Figure 6A:
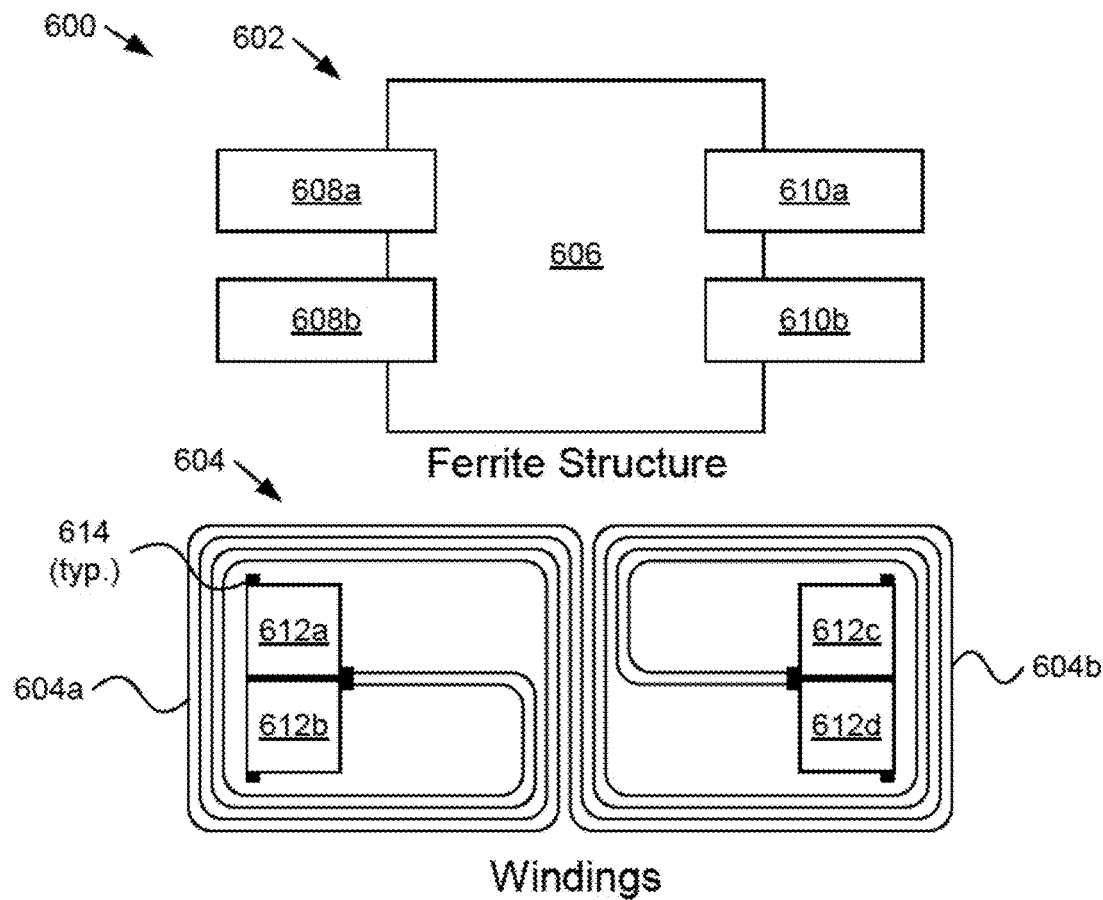
FIG. 6A is a schematic block diagram illustrating a bottom view of an example biplane WPT pad with a magnetic structure separated from windings in accordance with at least one embodiment.
Figure 6B:
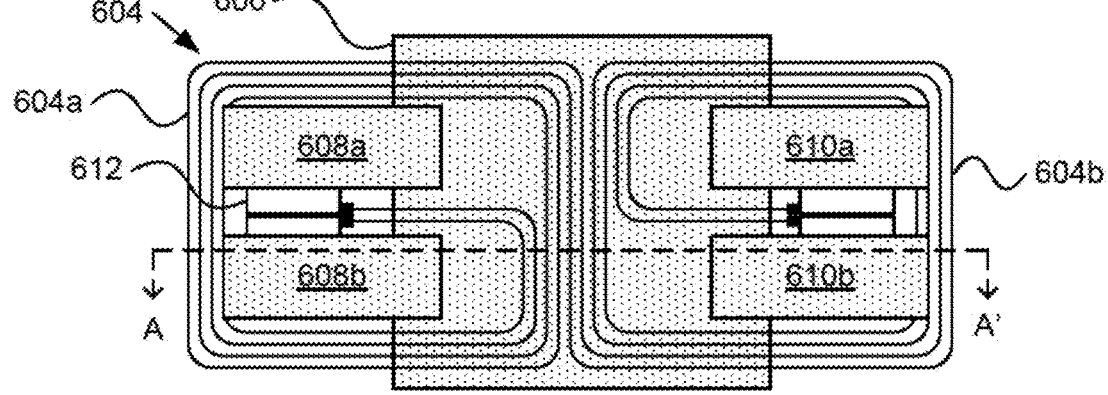
FIG. 6B is a schematic block diagram illustrating a bottom view of the biplane WPT pad of FIG. 6A with a magnetic structure together with the windings in accordance with at least one embodiment.
Figure 6C:
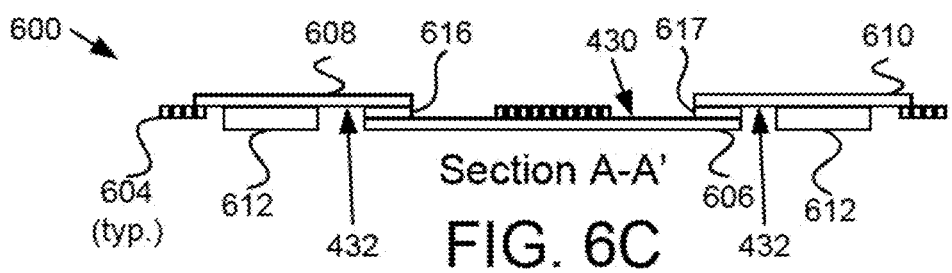
FIG. 6C is a schematic block diagram illustrating a side section view A-A' from FIG. 6B of the biplane WPT pad and windings in accordance with at least one embodiment.

FIG. 6A is a schematic block diagram illustrating a bottom view of a biplane WPT pad 600 with a magnetic structure 602 separated from windings 604. The bottom view is of a side that would face another WPT pad for wireless power transfer. FIG. 6B is a schematic block diagram illustrating a bottom view of the biplane WPT pad 600 of FIG. 6A with the magnetic structure 602 together with the windings 604 and FIG. 6C is a schematic block diagram illustrating a side section view A-A' from FIG. 6B of the magnetic structure 602 biplane WPT pad 600 and windings 604. The magnetic structure 602 includes a first main section 606, first side sections 608a, 608b and second side sections 610a, 610b, which are substantially similar to the first main section 410, first side section 412 and second side section 414 described above in relation to FIG. 4. The first main section 606 includes a winding facing side 430 that is planar for at least the portion adjacent to the windings 604. The magnetic structure 602 also includes first side sections 608a, 608b (collectively "608") and second side sections 610a, 610b (collectively "610") that are offset from the first main section 606 and have a winding facing side 432 that is planar for at least the portion adjacent to the windings 604.

In some embodiments, the magnetic structure 602 includes multiple magnetic pieces that are in contact or are adjacent to each other. For example, the magnetic pieces may be pieces of a soft ferrite. For example, a non-magnetic structure, such as nylon, plastic, etc. may be formed to hold magnetic pieces close to and/or touching one another. The non-magnetic structure may also have openings for the windings 604, capacitors 612, contacts 614, conductors, or the like. In other embodiments, the magnetic structure 602 includes a unitary magnetic element shaped to have a first main section 606 and offset side sections 608, 610.

In some embodiments, the magnetic structure 602 includes magnetic properties capable of forming a magnetic field in the presence of electrical current in the windings 604. In some embodiments, the magnetic structure includes materials typically used for magnetic structures, which may be soft ferrites or other materials that display ferromagnetic properties. The magnetic structure 602 may include materials such as manganese-zinc, nickel-zinc or other suitable material. The magnetic structure 602 may include multiple pieces that are magnetically coupled, for example, by being placed next to each other and/or coupled with each other, or may include a monolithic structure that is molded, cast, laminated, or otherwise formed to be a single piece. One of skill in the art will recognize other materials suitable for creating a magnetic structure 602.

In some embodiments, the magnetic structure 602 includes first and second vertical sections 616, 617 to separate the first main section 606 from the side sections 608, 610, which function in a similar was as the first and second vertical sections 416, 417 of FIG. 4. In some embodiments, the vertical sections 616, 617 are sized so that the first and second windings 604a, 604b are planar and/or coplanar. In other embodiments, the magnetic structure 602 does not include vertical sections 616, 617.

The windings 602 are depicted as two conductors in parallel for a first winding 604a on the left and a second winding 604b on the right. The first and second windings 604a-b are connected in series so that current in the first winding 604a, starting at the center, would flow clockwise and would then flow counterclockwise in the second winding 604b on the right, which would create a south pole on the left and a north pole on the right, or vice-versa—depending on the direction of current flow.

In the biplane WPT pad 600 of FIGS. 6A-C, capacitors are placed in the centers of the windings 604. The capacitors are depicted with two capacitor banks 612a, 612b on the left and two capacitor banks 612c, 612d on the right. In some embodiments, each capacitor bank 612 includes two or more capacitors, but also may include a single capacitor. In some embodiments, the capacitor banks 612 are similar to the capacitors C4 of FIG. 3A, or possibly capacitor C3 of FIG. 2A. Where the biplane WPT pad 600 is a secondary WPT pad 128 and is a biplane WPT pad 402, placement of the capacitor banks 612 as depicted is convenient because the capacitors are above the side sections and can be shielded from the electromagnetic field generated by the windings 604a, 604b and magnetic structure 602. One of skill in the art will recognize how to connect and arrange capacitors in each capacitor bank 612 of the biplane WPT pad 600.

Figure 7:
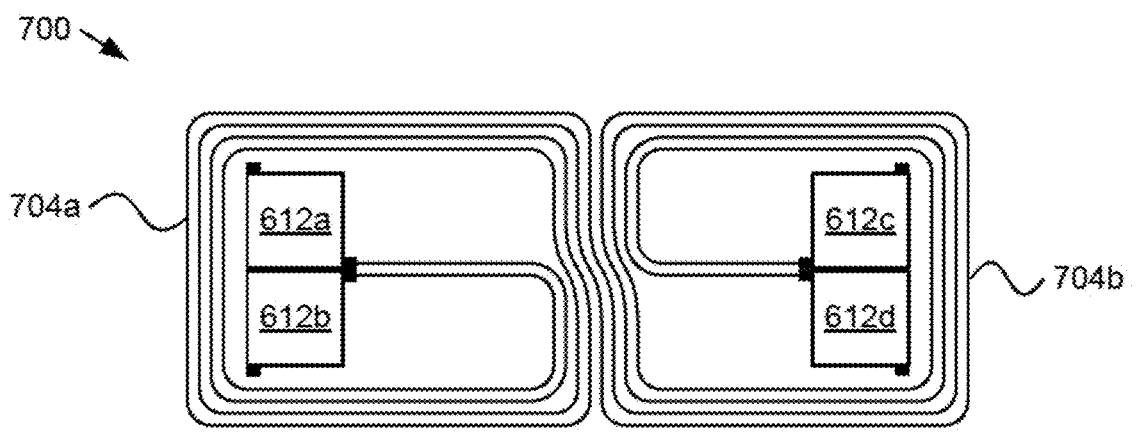
FIG. 7 is a schematic block diagram illustrating an alternate example configuration of windings of a biplane WPT pad with symmetry in a center section in accordance with at least one embodiment.

Connection of the windings 604a, 604b are depicted connecting from a center section of the first main section 606 and extending toward the side sections 608, 610 along a centerline bisecting the first main section 606 and running left to right, which provides a degree of symmetry for the windings 604a, 604b. Note that the symmetry in the center portion of the first main section 606 is skewed some due to portions of the windings 604a, 604b connected to the capacitor banks 612 running further away from the center of the first main section 606 than other windings that cross through this middle portion of the first main section 606. This asymmetry in the center portion of the first main section 606 would account for some asymmetry of the electromagnetic field generated by the windings 604a, 604b of the biplane WPT pad 600. FIG. 7 is a schematic block diagram illustrating an alternate configuration 700 of windings 704a, 704b of a biplane WPT pad 600 with symmetry in a center section. The windings 704a, 704b are offset in the center section to improve symmetry.

Figure 8:
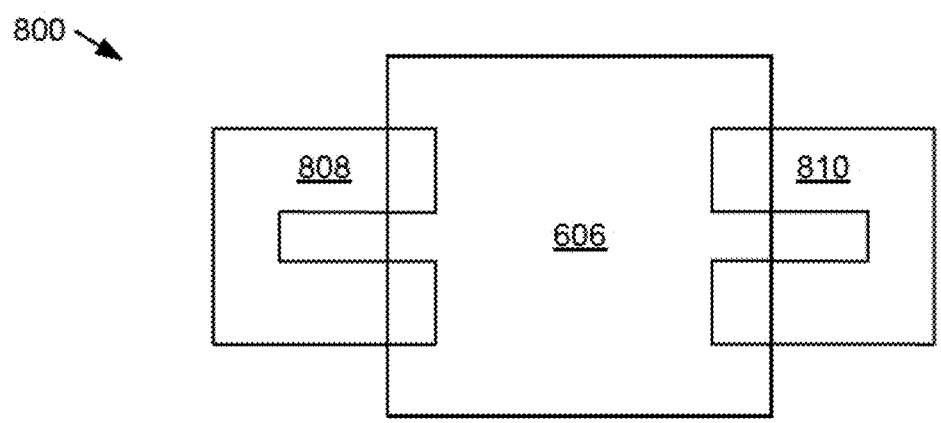
FIG. 8 is a schematic block diagram illustrating an alternate example magnetic structure for the biplane WPT pad in accordance with at least one embodiment.

Extending the windings 604a, 604b, 704a, 704b from the center of the first main section 606 as depicted necessitates an opening of some sort to extend through the first and second side sections 608a, 608b, 610a, 610b and/or through any vertical sections 616, 617. In the embodiment depicted in FIGS. 6A and 6B, the first and second side sections 608a, 608b, 610a, 610b are split in two parts each (e.g., 608a and 608b on the first side section and 610a and 610b on the second side section). FIG. 8 is a schematic block diagram illustrating an alternate magnetic structure 800 for the biplane WPT pad 600 where the two portions of the first side section 608a, 608b are joined to form a single side section 808 with a slit to accommodate the first winding 604a. The second side section 810 is similar to the first side section 808.

For the design of FIG. 8, the opening in the magnetic material for the windings 604a, 604b is now encircled by magnetic material, which creates a toroid structure and could potentially cause circulating current in the magnetic material. The size of the opening is chosen to minimize any unwanted circulating current. For example, a small opening in the magnetic material to accommodate the windings 604a, 604b is likely to exhibit higher circulating current than a larger opening. Beneficially, the side sections depicted in FIG. 8 will have less variation in mutual coupling as a vertical section 424, 426 moves over the side sections 808, 810 than with a full split as depicted in FIGS. 6A and 6B. Circulating current due to a toroid-like structure with side sections 808, 810 as depicted in FIG. 8 can be traded off with variations in mutual coupling with third and fourth vertical sections 424, 426 to size the opening for the windings 604a, 604b.

The magnetic structure 602 of the biplane WPT pad 600 of FIGS. 6A-6C is depicted with a rectangular first main section 606 and side sections 608a, 608b, 610a, 610b. However, other designs with other shapes are contemplated herein and would have similar benefits to the biplane WPT pad 600 of FIGS. 6A-6C. For example, other designs may have side sections that are round or oval and the third and fourth vertical sections 424, 426 of a corresponding WPT pad 404 may also be round, oval, etc. In other embodiments, the first main section 606 extends further under the side sections 608, 610 than shown in FIGS. 6B and 6C. In other embodiments, the side sections 608, 610 are wider and extend over the windings 604a, 604b.

In other embodiments, the magnetic structure 602 is shaped differently than the planar structures depicted in FIGS. 6A-6C. For example, the magnetic structure 602 may be shaped to differently on sides that are not facing the windings 604a, 604b. In other embodiments, the biplane WPT pad 600 includes a backplane and conductive side structures that help contain stray electromagnetic fields. In other embodiments, the biplane WPT pad 600 includes other structure to hold the windings 604a, 604b, magnetic elements of the magnetic structure 602, the capacitor banks 612, and the like. One of skill in the art will recognize other shapes for the magnetic structure 602 and windings 604a, 604b.

The windings 604a, 604b (generically "604") are depicted helical that start in a center section and are wound in a planar shape where each subsequent lap of the windings 604 is further from the center section than previous laps of the windings 604. Beneficially, this planar winding helps to shape an electromagnetic field formed by the biplane WPT pad 600 to be directional toward another WPT pad 404. While the windings 604 are depicted as having a rectangular-type shape, in other embodiments the windings 604 are circular in an Archimedean spiral. While each conductor of the windings 604 are depicted as evenly spaced apart, in other embodiments, the conductors vary in distance apart.

In some embodiments, the conductors of the windings 604 are made of Litz wire to minimize frequency effects, eddy currents, and the like. In some embodiments, each of the depicted two conductors of a winding 604 is made up of four conductors where each is a Litz wire. The conductors of a winding 604 may be terminated in multiple lugs to increase power transfer capabilities of the biplane WPT pad 600. In some embodiments, the biplane WPT pad 600 may be capable of wireless power transfer of 50 kilowatts ("kW") and may be capable of higher wireless power transfer, such as 250 kW, 500 kW or more.

Figure 9A:
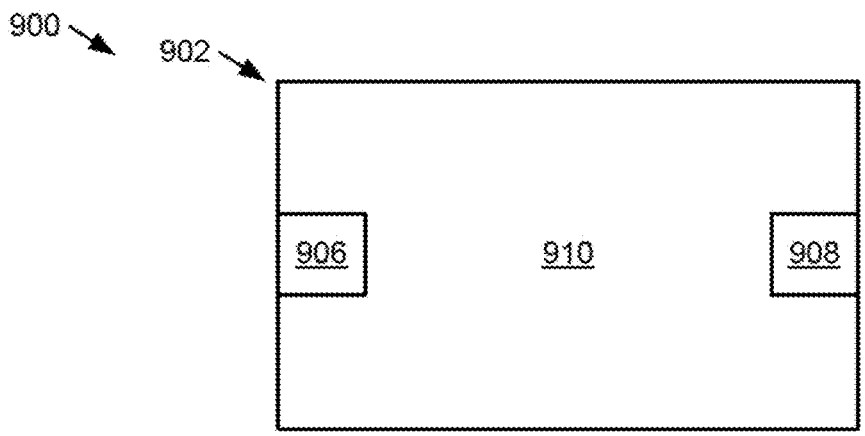
FIG. 9A is a schematic block diagram illustrating a top view of an example WPT pad with vertical sections with a magnetic structure separated from windings in accordance with at least one embodiment.
Figure 9A:
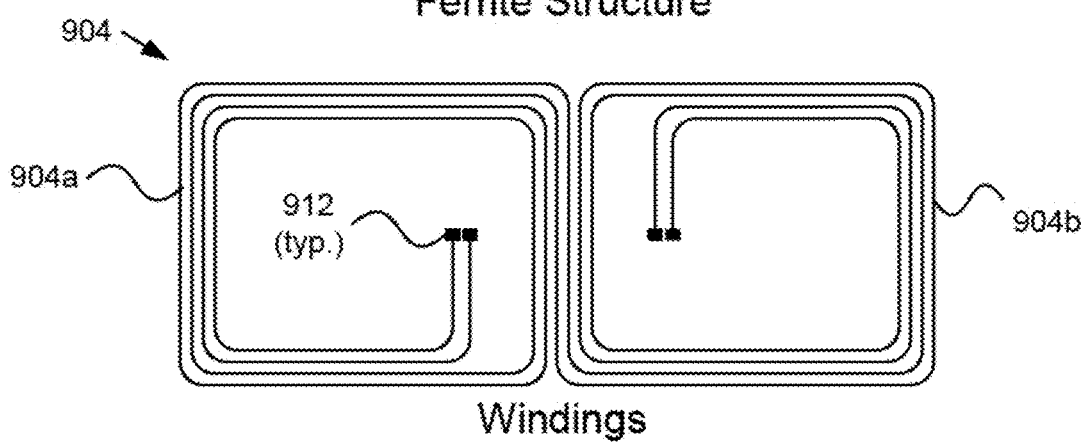
Figure 9B:
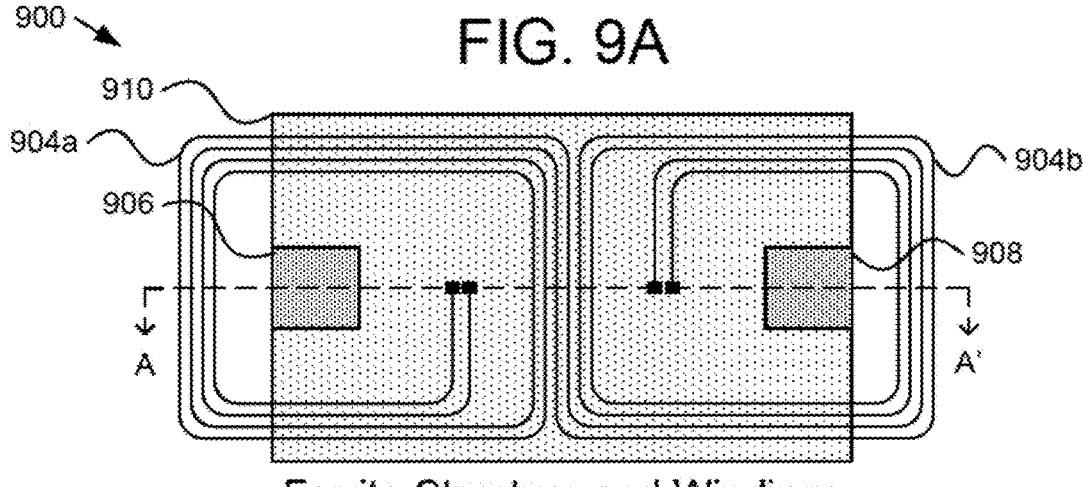
FIG. 9B is a schematic block diagram illustrating a top view of the WPT pad with vertical sections of FIG. 9A with the magnetic structure combined with the windings in accordance with at least one embodiment.
Figure 9C:
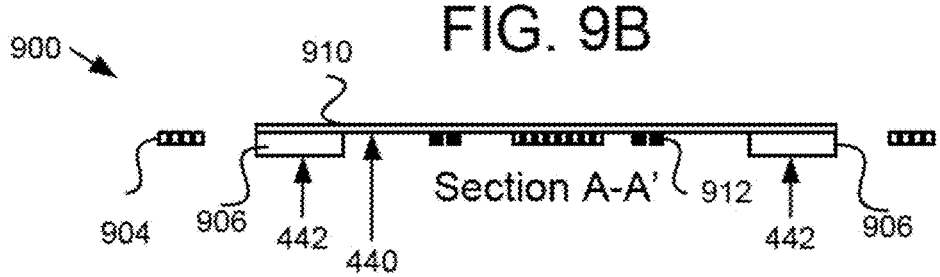
FIG. 9C is a schematic block diagram illustrating a side section view A-A' from FIG. 9B of the WPT pad with vertical sections in accordance with at least one embodiment.

FIG. 9A is a schematic block diagram illustrating a top view of a WPT pad 900 with third and fourth vertical sections 906, 908 with a magnetic structure 902 separated from windings 904. FIG. 9B is a schematic block diagram illustrating a top view of the WPT pad 900 with third and fourth vertical sections 906, 908 of FIG. 9A with the magnetic structure 902 combined with the windings 904. FIG. 9C is a schematic block diagram illustrating a side section view A-A' from FIG. 9B of the WPT pad 900 with third and fourth vertical sections 906, 908.

The WPT pad 900 with third and fourth vertical sections 906, 908 of FIGS. 9A-9C is substantially similar to the second WPT pad 404 of FIG. 4. The WPT pad 900 with third and fourth vertical sections 906, 908 includes a third winding 904a and a fourth winding 904b (collectively "windings 904"). The third and fourth windings 904 include conductors and, in some embodiments, are connected, similar to the first and second windings 604 of FIGS. 6A-6C. In some embodiments, the third and fourth windings 904 include Litz wire and in other embodiments are configured in four parts as described above in relation to the first and second windings 604 of FIGS. 6A-6C.

The WPT pad 900 with third and fourth vertical sections 906, 908 includes a second magnetic structure 902 that includes a second main section 910 with a winding facing side 440, a third vertical section 906 and a fourth vertical section 908. The third and fourth vertical sections 906, 908 of FIGS. 9A-9C are substantially similar to the third and fourth vertical sections 424, 426 of FIG. 4. The second magnetic structure 902 is "U" shaped where the open end of the U is facing another aligned WPT pad, such as the biplane WPT pad 600. The third and fourth vertical sections 906, 908 each extend away from the winding facing side 440 of the second main section 910 and each vertical section 906, 908 includes a planar end 442 that are parallel to each other and to the winding facing side 440 of the second main section 910. The third vertical section 906 extends through the third winding 904a and the fourth vertical section 908 extends through the fourth winding 904b. In some embodiments, each vertical section 906, 908 of the second magnetic structure 902 extends away from the second main section 910 a distance equal to or greater than a distance that the third and fourth windings 904 extend away from the second main section 910. Having the third and fourth vertical sections 906, 908 extend beyond the windings 904 helps to direct electromagnetic flux through the planar ends 442 of the third and fourth vertical sections 906, 908.

As with the biplane WPT pad 600, the windings 904 are wound starting in a center section with each succeeding lap wound further from the center section than a previous lap. The windings 904 are depicted wound in a same plane and are in a rectangular-like pattern but may be wound in other patterns. Current in the windings 904 induces an electromagnetic field that has a concentration of magnetic flux emanating from the planar ends 442 of the third and fourth vertical sections 906, 908, which extends toward the non-winding facing side 434 of the side sections 608, 610 of the biplane WPT pad 600. In some embodiments, the windings 904 are wound to create an opposite polarity in the third and fourth windings 904a, 904b, which creates opposite poles at the third and fourth vertical section 906, 908. Typically, where the first winding 604a is wound with respect to the first side section 608 to create a south pole, the third winding 904a is wound with respect to the third vertical section 906 to create a north pole. Where the second winding 604b is wound with respect to the second side section 610 to create a north pole, the fourth winding 904b is wound with respect to the fourth vertical section 908 to create a south pole. Thus, magnetic flux flows from the first side section 608 through the first main section 606 to the second side section 610, to the fourth vertical section 908, through the second main section 910, to the third vertical section 906 and then to the first side section 608—or vice versa where current through the windings 604, 904 is switched.

Thus, in one embodiment power from a power source 112 flows through resonant converters 118 to a primary pad 126, which may be the second WPT pad 404, 900 and is wirelessly transferred through mutual coupling of the second WPT pad 404, 900 and the biplane WPT pad 402, 600. Power from the biplane WPT pad 402, 600 flows to secondary circuits 130 to a load 110. The first and second WPT pads 402, 900, 404, 600 are configured to transfer power wirelessly over a gap 108 between each other. The planar end 442 of the third and fourth vertical sections 424, 906, 426, 908 have a surface area smaller than the non-winding facing side 434 of the first and second side sections 412, 608, 414, 610.

Figure 10A:
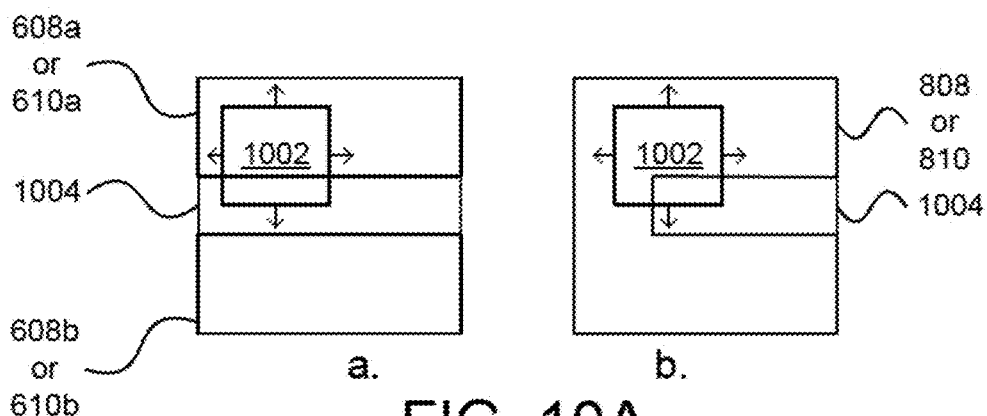
FIG. 10A is a schematic block diagram illustrating a top of a vertical section overlayed with an outline of a side section of a) the magnetic structure of the biplane WPT pad of FIG. 6A and b) and the alternate magnetic structure of the biplane WPT pad of FIG. 8 in accordance with at least one embodiment.

FIG. 10A is a schematic block diagram illustrating a top of a vertical section 1002 overlayed with an outline 1004 of a side section of a) the magnetic structure 602 of the biplane WPT pad 600 of FIG. 6A and b) and the alternate magnetic structure 800 of the biplane WPT pad of FIG. 8. The vertical section 1002 is substantially similar to the third and fourth vertical sections 424, 426, 906, 908 of the WPT pads 404, 900 of FIGS. 4 and 9A-9C. Note that the area of the vertical section 1002 is greater than the outline 1004 of the side sections 608a, 608b, 610a, 610b, 808, 810, which allows for movement of a particular vertical section 1002 (e.g., 906) with respect to the outline 1004 of a particular side section (e.g., 608a, 608b or 808) while maintaining mutual coupling at a fairly consistent level.

Figure 10B:
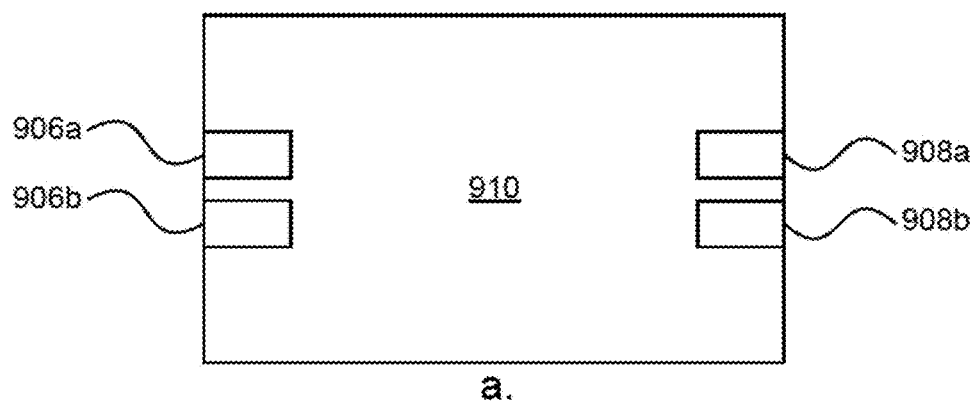
FIG. 10B is a schematic block diagram illustrating different examples of the magnetic structure of the WPT pad of FIGS. 9A and 9B with split vertical sections in accordance with at least one embodiment.
Figure 10B:
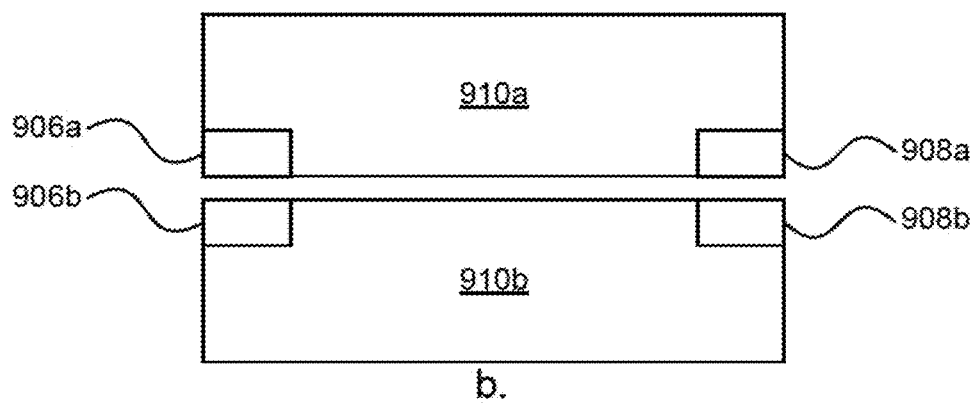
Figure 10B:
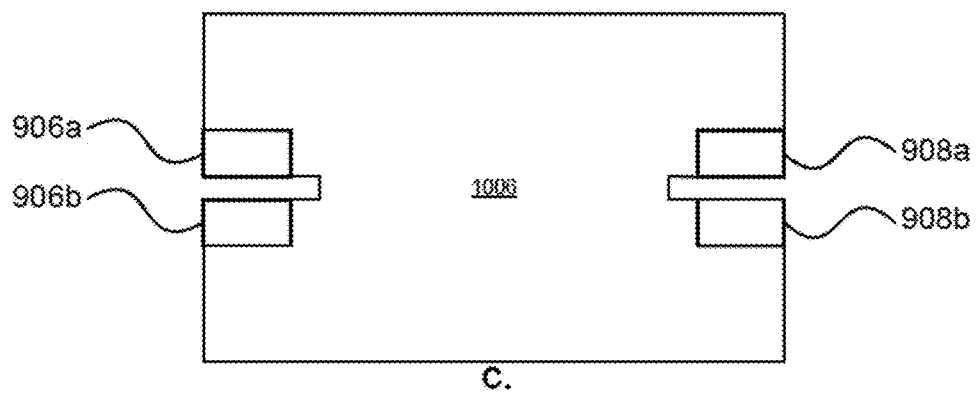

FIG. 10B is a schematic block diagram illustrating different embodiments of the magnetic structure of the WPT pad of FIGS. 9A and 9B with split vertical sections. The embodiments include split third and fourth vertical sections 906a, 906b, 908a, 908b to accommodate windings (not shown) for the WPT pad 900 where windings are configured similar to the windings 604a, 604b of the biplane WPT pad 600 of FIGS. 6A and 6B so that the windings are symmetrical. The WPT pad 900 may include capacitor banks similar to the capacitor banks 612 of FIGS. 6A-6C located external to the third and fourth vertical sections 906a, 906b, 908a, 908b where the windings extend through the split in the third and fourth vertical sections 906a, 906b, 908a, 908b. The first embodiment a. includes a continuous second main section 910 with split third and fourth vertical sections 906a, 906b, 908a, 908b. The second embodiment b. includes a split second main section 910a, 910b along with split third and fourth vertical sections 906a, 906b, 908a, 908b. The third embodiment c. includes a notched second main section 1006 with split third and fourth vertical sections 906a, 906b, 908a, 908b. All three embodiments accommodate windings extending through the split between the third and fourth vertical sections 906a, 906b, 908a, 908b. One of skill in the art will recognize other configurations of the magnetic structure 902 of the WPT pad 900 with vertical sections and no side sections.

Figure 11A:
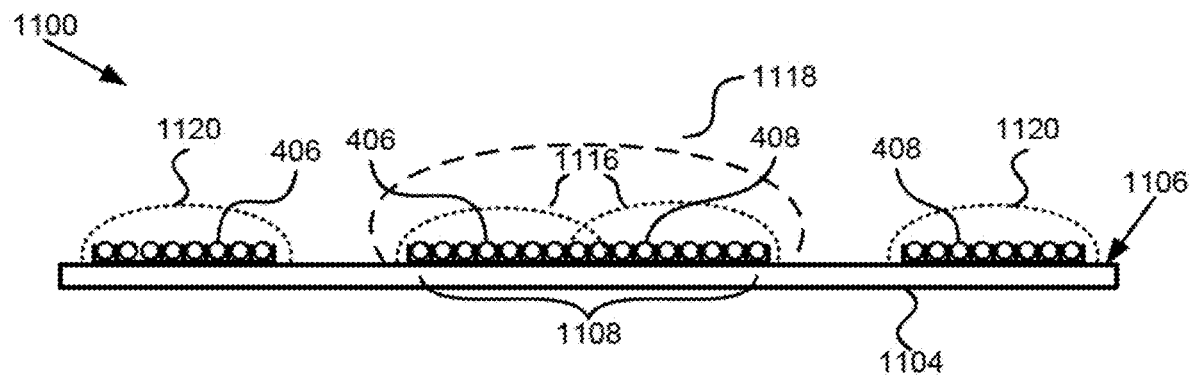
FIG. 11A depicts a side section view of an example wireless power transfer pad with windings in one plane in accordance with at least one embodiment.

FIG. 11A depicts a side section view of one embodiment of a wireless power transfer pad 1100 with first and second windings 406, 408 in one plane. FIG. 11A depicts another embodiment that serves to illustrate an alternate design. In the embodiment, a portion 1108 of the first and second windings 406, 408 are adjacent. In the design depicted in FIG. 11A, two coils are positioned on top of a single, planar magnetic structure 1104. Each of the first and second windings 406, 408 generate a magnetic field 1116 shaped to radiate upward, away from the magnetic structure 1104 so that a resulting electromagnetic flux pattern 1118 that extends higher than each of the first and second windings 406, 408 alone.

However, the portions of the first and second windings 406, 408 away from the center also generate electromagnetic flux 1120 and do not readily combine with each other so that only the portion over the adjacent sections combine to form a heightened electromagnetic flux pattern 1118. In addition, the first and second windings 406, 408 do not wrap around the magnetic structure, so generated magnetic flux is less than other designs that wrap around the magnetic structure. The electromagnetic flux 1120 over the portion of the first and second windings 406, 408 do not contribute in any significant way to power transfer to the secondary pad 128 and are typically unwanted. Leakage electromagnetic flux may make it more difficult to comply with regulations and may require shielding, barriers to keep people away, etc. Elimination or minimization of the leakage electromagnetic flux, such as the electromagnetic flux 1120 in FIG. 11A is beneficial in many circumstances. Example wireless power transfer pad 1100 does not include solenoidal features, as the term is used herein (e.g., does not incorporate a solenoid). Example wireless power transfer pad 1100 is not a biplane wireless power transfer pad, as the term is used herein (e.g., does not include windings arranged in at least two geometric planes such as two parallel planes).

Figure 11B:
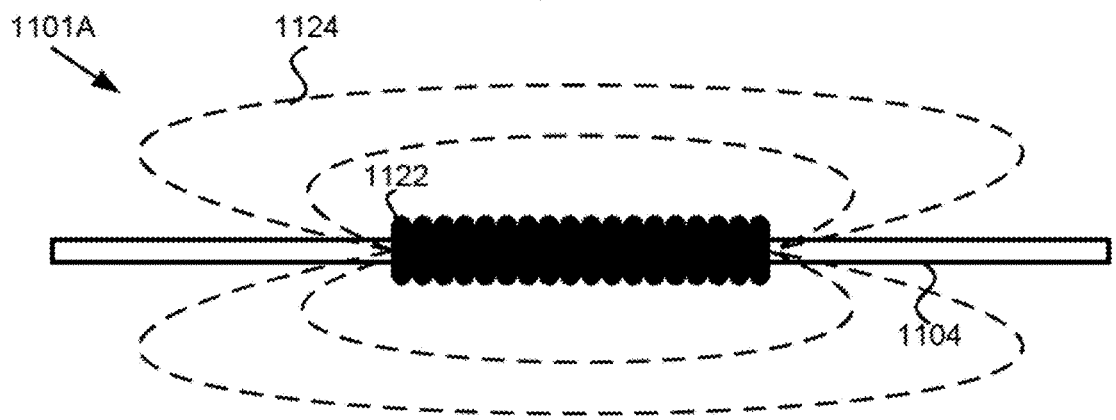
FIG. 11B depicts an example solenoid with a magnetic structure with a winding wrapped around the magnetic structure in accordance with at least one embodiment.

FIG. 11B depicts a solenoid 1101A with a magnetic structure 1104 and a winding 1122 wrapped around the magnetic structure 1104. The magnetic structure 1104 and winding 1122 are in the form of a typical solenoid 1101A. Wrapping the winding 1122 around the magnetic structure 1104 provides a strong electromagnetic field 1124 with a north pole at one end and a south pole at the other end. The electromagnetic field 1124 is affected by the shape of the magnetic structure 1104 and winding 1122. The magnetic structure 1104 may be shaped as a rectangular prism with a top side that is planar.

Figure 11C:
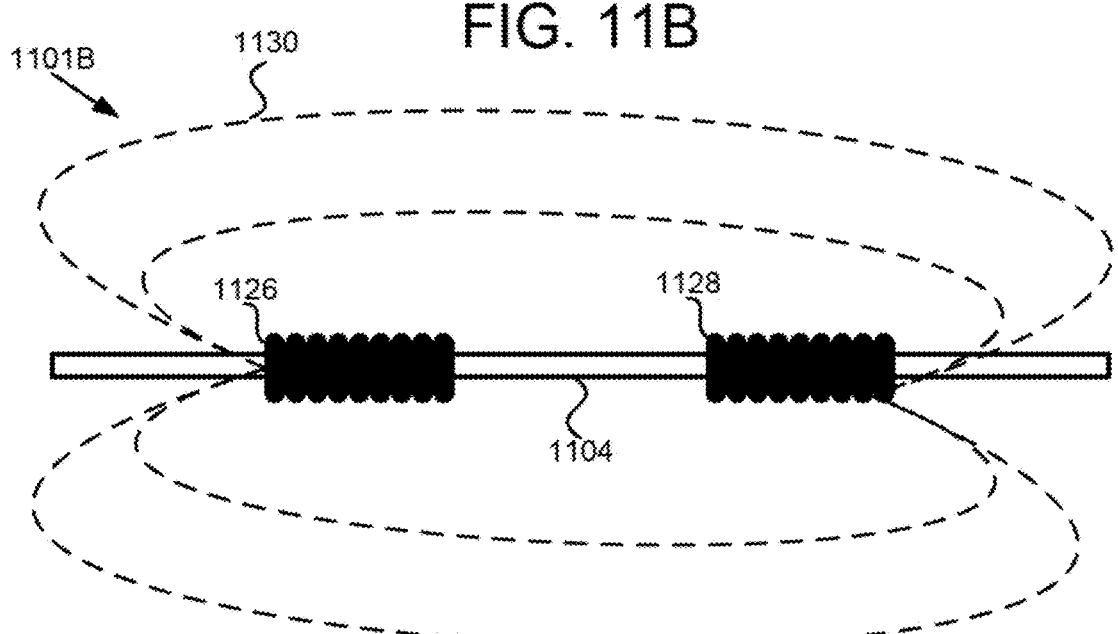
FIG. 11C depicts an example solenoid with a magnetic structure with two windings wrapped around the magnetic structure in accordance with at least one embodiment.

FIG. 11C depicts another solenoid 1101B with magnetic structure 1104 and two windings 1126, 1128 wrapped around the magnetic structure 1104. By splitting the winding 1122 of the solenoid 1101A of FIG. 11B into two windings 1126, 1128, the north and south poles may be spread apart, which may then form an electromagnetic field 1130 that extends further from the magnetic structure 1104 than the electromagnetic field 1124 of the solenoid 1101A of FIG. 11B.

Figure 11D:
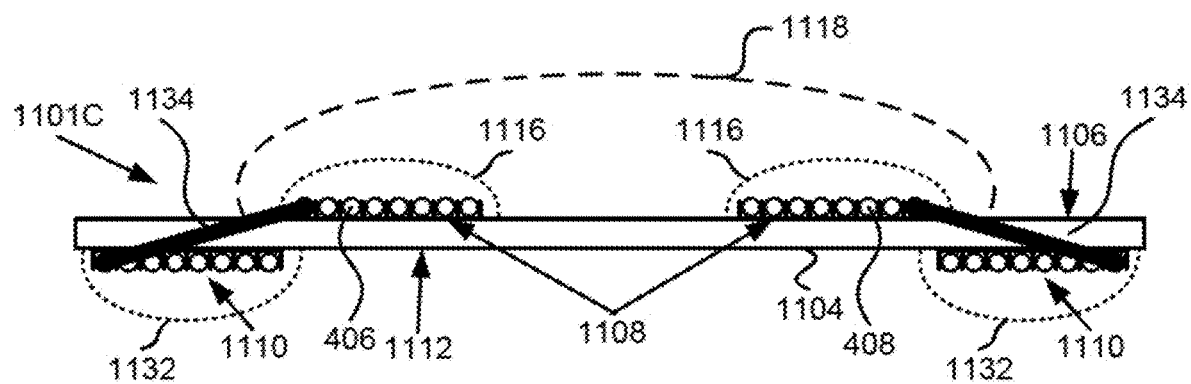
FIG. 11D depicts a side section view of an example wireless power transfer pad with a uniform magnetic structure and windings extending above and below the magnetic structure in accordance with at least one embodiment.

FIG. 11D depicts a side section view of one embodiment of a wireless power transfer pad 1101C with a uniform magnetic structure 1104 and a winding extending above and below the magnetic structure 1104. By wrapping the first and second windings 406, 408 around to the bottom side of the magnetic structure 1104 or by feeding the first and second windings 406, 408 through gaps (not shown) in the magnetic structure 1104, a portion 1110 of the first and second windings 406, 408 are below the bottom side 1112 of the magnetic structure 1104 and radiate electromagnetic flux 1132 downward away from the bottom side 1112 of the magnetic structure 1104. Thus, the unwanted electromagnetic flux 1120 of the WPT pad 1100 of FIG. 11A is modified for the WPT pad 1101C of FIG. 11D so that the unwanted electromagnetic flux 1132 radiates downward, which may be more easily controllable. For example, at least a portion of the unwanted electromagnetic flux 1132 may be directed into the earth where the WPT pad 1101C is ground mounted. In other embodiments, shielding or measures may be taken under the WPT pad 1101C to minimize impact. A disadvantage of the design of the WPT pad 1101C depicted in FIG. 11D is that the WPT pad 1101C has the added thickness of the portion 1110 of the first and second windings 406, 408 and any associated support structure for the first and second windings 406, 408. Adding thickness to a WPT pad (e.g. 1100, 1101C) may be inconvenient.

Figure 11E:
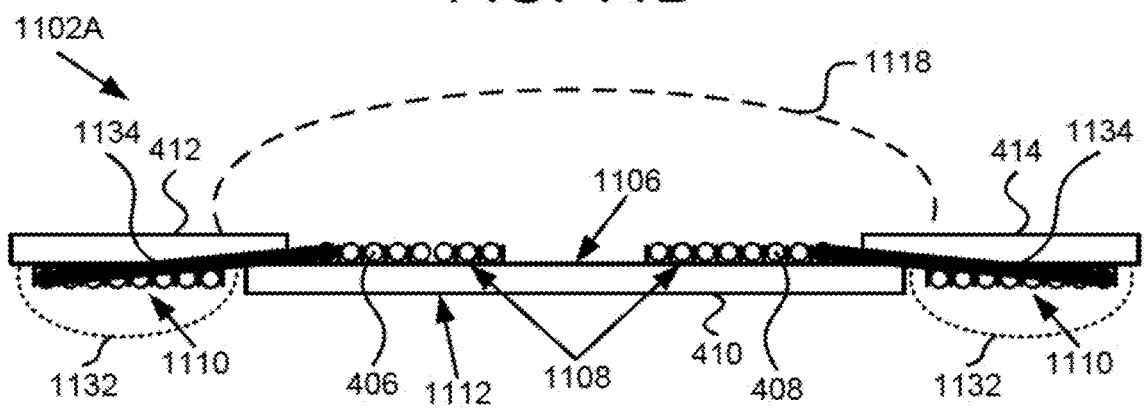
FIG. 11E depicts a side section view of an example wireless power transfer pad with a biplane magnetic structure and accompanying windings extending above and below sections of the magnetic structure in accordance with at least one embodiment.

FIG. 11E depicts a side section view (e.g. modified section A-A' of FIG. 6B without the vertical sections 616, 617) of one embodiment of a wireless power transfer pad 1102A with a biplane magnetic structure and accompanying windings 406, 408 extending above and below sections of the magnetic structure. Like the WPT pad 1101C of FIG. 11D, a portion 1110 of the first and second windings 406, 408 extend below the magnetic structure. However, the magnetic structure is modified to include a main section 410, a first side section 412 and a second side section 414 as depicted in the first WPT pads 402, 600 of FIGS. 4, 5 and 6A-6C. By placing the first and second side sections 412, 414 above the main section 410 as depicted, or at least elevated with respect to the main section 410, where the portions 1110 below the first and second side sections 412, 414 are lifted above where they are located in the WPT pad 1101C of FIG. 11D, the first and second side sections 412, 414 are placed closer to the third and fourth vertical sections 424, 426 of a second WPT pad 404, which increases magnetic coupling. In addition, at least a portion of the unwanted electromagnetic flux 1132 is again directed downward, away from the bottom of the first and second side sections 412, 414.

In one embodiment, the first and second windings 406, 408 may be routed through an opening of the main section 410 or in notches (not shown) in the main section 410. Routing the first and second windings 406, 408 through the opening or notches may be a convenient way to maintain the shape of the portion 1108 of the first and second windings 406, 408 over the main section 410 while allowing the first and second windings 406, 408 to transition to the winding facing side 432 of the first and second side sections 412, 414. While the path of the first and second windings 406, 408 are depicted as straight, one of skill in the art will recognize that the first and second windings 406, 408 may bend to be routed through the openings or notches.

In another embodiment, such as depicted in the first WPT pad 402, 600 of FIGS. 4, 5 and 6A-6C, the first and second windings 406, 408 may be routed around edges of the main section 410. Routing the first and second windings 406, 408 around edges of the main section 410 may allow for a more compact magnetic structure than is depicted in the first WPT pad 402, 600 of FIGS. 4, 5 and 6A-6C. For clarity, routing of the first and second windings 406, 408 from above the main section 410 to below the first and second side sections 412, 414 is not depicted except for a single conductor 1134 for each winding 406, 408.

Figure 11F:
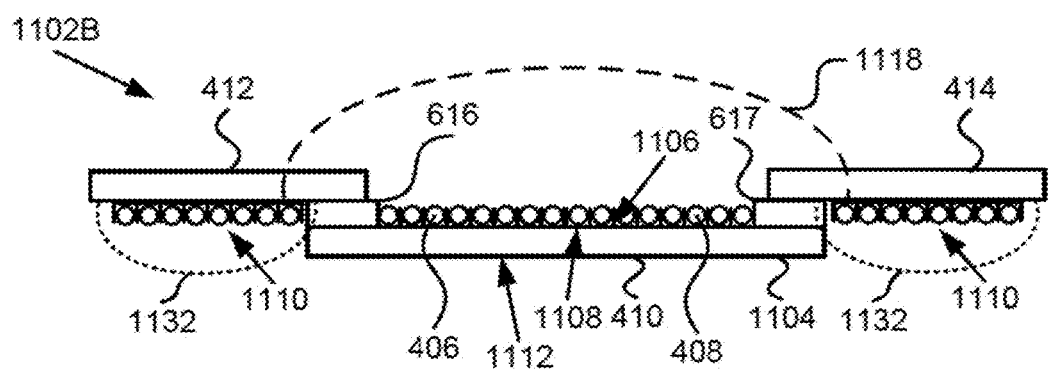
FIG. 11F depicts a side section view of another example wireless power transfer pad with a biplane magnetic structure and accompanying windings extending above and below sections of the magnetic structure, where a portion of the windings are adjacent in accordance with at least one embodiment.

FIG. 11F depicts a side section view of another embodiment of a wireless power transfer pad 1102B with a biplane magnetic structure and accompanying first and second windings 406, 408 extending above and below sections of the magnetic structure, where a portion of the first and second windings 406, 408 are adjacent and the first and second windings 406, 408 are substantially coplanar. As used herein, the first and second windings 406, 408 being substantially coplanar means that most of the first and second windings 406, 408 are coplanar except for possibly end portions of the first and second windings 406, 408 that may slope to connections, such as to connections to the capacitor banks 612a, 612b or other termination points. The magnetic structure of the WPT pad 1102B may be similar to the magnetic structure of the WPT pad 1102A, except the main section 410 may be smaller so that the overall width of the WPT pad 1102A may be less than the WPT pad 1102A of FIG. 11E and vertical sections 616, 617 between the first and second side sections 412, 414 and the first main section 410. Maintaining the first and second windings 406, 408 substantially coplanar aids in construction of the first and second windings 406, 408 where the conductors of the first and second windings 406, 408 may be stiff or rigid.

A smaller main section 410 with first and second windings 406, 408 may have an electromagnetic flux pattern 1118 above the main section 410 that is less wide than where the first and second windings 406, 408 are split, but may provide a more compact design. In other embodiments, reducing a space between the first and second windings 406, 408 may be the result of adding additional wraps to the first and second windings 406, 408. In another embodiment, reducing a space between the first and second windings 406, 408 may result in an increased center section for the capacitor banks 612a, 612b. One of skill in the art will recognize other designs with and without a space between the first and second windings 406, 408.

Note that shaping of the portions 1108 of the first and second windings 406, 408 may be used to shape the electromagnetic flux pattern 1118 above the magnetic structure. The types of conductors, the spacing of the conductors, the routing of the conductors, etc. may be used to modify the electromagnetic flux pattern 1118 above the magnetic structure.

Figure 11G:
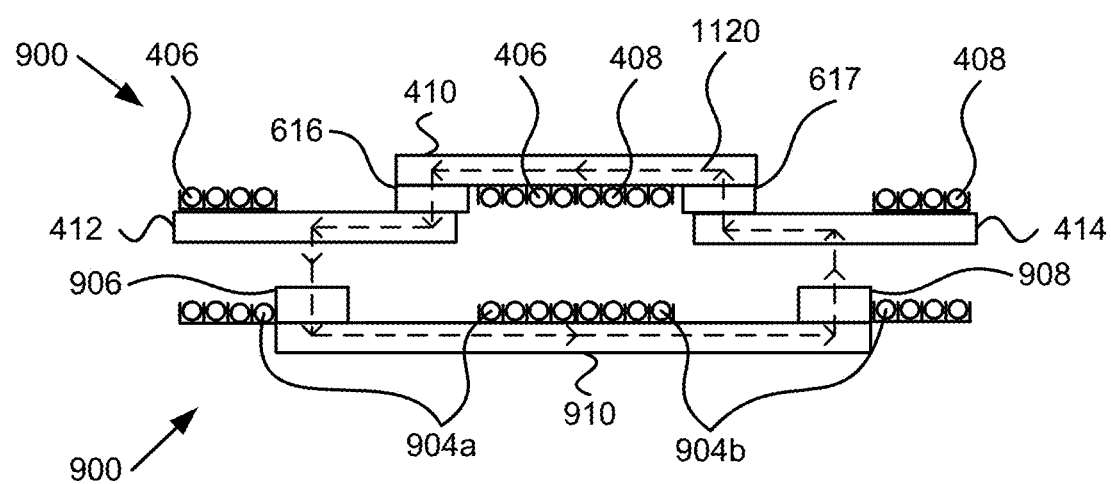
FIG. 11G depicts a side section view of another example of first and second WPT pads generating an electromagnetic flux pathway in accordance with at least one embodiment.

FIG. 11G depicts a side section view of another embodiment of the first and second WPT pads 600, 900 depicting an electromagnetic flux pathway 1120. In some embodiments, there are multiple windings 406, 408 on the first WPT pad 600 and multiple windings 904a, 904b on the second WPT pad 900 where the windings 406, 408 on the first WPT pad 600 are coupled with the magnetic structure 602 and the windings 904a, 904b are coupled with the second WPT pad 900. In some embodiments, the windings 406, 408 on the first WPT pad 600 are connected and wound to create opposite polarities in the first and second windings 604a, 604b and the third and fourth windings 904a, 904b on the second WPT pad 900 are connected and wound to create opposite polarities in the third and fourth windings 904a, 904b and the windings 604a, 604b, 904a, 904b are wound such that there is a north pole at the first winding 604a, a south pole at the second winding 604b, a north pole on the fourth winding 904b and a south pole at the third winding 904a—or vice-versa. This creates an electromagnetic flux pathway 1120 as depicted in FIG. 11G, which is an efficient way to reduce stray electromagnetic flux and to transfer power wirelessly between the first and second WPT pads 600, 900.

Figure 12:
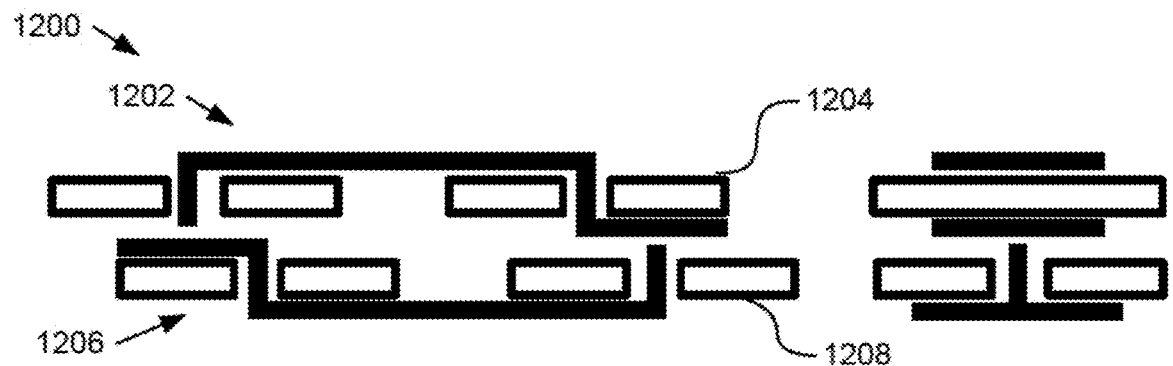
FIG. 12 is a schematic block diagram illustrating a side section view and an end section view of an example combination biplane/vertical section WPT pad as a secondary WPT pad with two windings over a combination biplane/vertical section WPT pad as a primary WPT pad in accordance with at least one embodiment.

FIG. 12 is a schematic block diagram 1200 illustrating a side section view and an end section view of a combination biplane/vertical section WPT pad 1202 as a secondary WPT pad 128 with two windings 1204 over a combination biplane/vertical section WPT pad 1206 as a primary WPT pad 126 with two windings 1208. In some embodiments, it may be advantageous to have WPT pads 1202, 1206 that are combination pads, which may aid in creating a single pad design to be used for both primary and secondary WPT pads 126, 128.

FIG. 13 is a schematic block diagram illustrating a biplane WPT pad 1300 with an in-line structure and three windings 1302a, 1302b, 1302c with three side sections 1304a, 1304b, 1304c. The center side section 1304b is larger than the end side sections 1304a, 1304b. The side sections 1304a, 1304b, 1304c are magnetically coupled with a main section 1306 and the windings 1302a, 1302b, 1302c are wound around the side sections 1304a, 1304b, 1304c. Advantageously, a biplane WPT pad 1300 with an in-line magnetic structure is narrow, which would fit well under some vehicles, such as busses, trans, trucks, etc. while minimizing leakage flux out of the sides of the in-line magnetic structure.

FIG. 14 is a schematic block diagram illustrating a biplane WPT pad 1400 with a triangular structure and three windings 1402a, 1402b, 1402c with three side sections 1404a, 1404b, 1404c. The three side sections 1404a, 1404b, 1404c are equal in size and in some embodiments the three windings 1402a, 1402b, 1402c are all wound in a same direction and power to or from each winding is offset by 120 degrees to minimize ripple. The biplane WPT winding 1400 with the triangular structure includes a main section 1406 that is magnetically coupled with each of the three side sections 1404a, 1404b, 1404c. By making the three windings 1402a, 1402b, 1402c oblong, as depicted, the overall structure may be more rectangular, which may be better suited for vehicles than if each of the three windings 1402a, 1402b, 1402c were round or square.

FIG. 15 is a schematic block diagram illustrating a first quad biplane WPT pad 1500 with a square structure and four windings 1502a, 1502b, 1502c, 1502d with four side sections 1504a, 1504b, 1504c, 1504d where the polarity is north-south-north-south. In some embodiments, the quad a biplane WPT pad 1500 is similar to the biplane WPT pad 402 of FIG. 4 but has additional windings 1502c, 1502d and side sections 1504c, 1504d and connecting magnetic material in the main section 1506. In some embodiments, the quad biplane WPT pad 1500 of FIG. 15 could be implemented as two biplane WPT pads 600 of FIGS. 6A-6C with windings 604 wound appropriately and magnetic material between the two magnetic structures 602. The quad biplane WPT pad 1500 of FIG. 15 is advantageous over the biplane WPT pad 402, 600 of FIGS. 4 and 6A-6C in providing more power than a biplane WPT pad 402, 600 with only two windings 406, 408, 604.

FIG. 16 is a schematic block diagram illustrating a second quad a biplane WPT pad 1600 with a square structure and four windings 1602a, 1602b, 1602c, 1602d with four side sections 1604a, 1604b, 1604c, 1604d where power to each side section is offset by 90 degrees. The second quad biplane WPT pad 1600 is substantially similar to the first quad biplane WPT pad 1500 of FIG. 15 but instead has power to each side section 1604a, 1604b, 1604c, 1604d offset by 90 degrees. In some embodiments, the four windings 1602a, 1602b, 1602c, 1602d are all separate and wound in a same direction.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a first wireless power transfer ("WPT") pad comprising:
   a first winding comprising a first conductive loop, the first winding being aligned with a first plane;
   a second winding comprising a second conductive loop, the second winding also aligned with the first plane; and
   a first magnetic structure comprising:
      a first main section;
      a first vertical section extending from the first main section that passes through an interior area of the first winding;
      a second vertical section extending from the first main section that passes through an interior area of the second winding;
      a first side section coupled to the first vertical section at an end distal to the first main section; and
      a second side section coupled to the second vertical section at an end distal to the first main section,
      wherein, the main section, the first and second vertical sections, and the first and second side sections of the first magnetic structure comprise a ferromagnetic material; and
a second WPT pad comprising:
   a third winding comprising a third conductive loop, the third winding being aligned with a second plane that is parallel to the first plane;
   a fourth winding comprising a fourth conductive loop, the fourth winding also aligned with the second plane; and
   a second magnetic structure comprising:
      a second main section;
      a third vertical section extending from the second main section that passes through an interior area of the third winding; and
      a fourth vertical section extending from the second main section that passes through an interior area of the fourth winding,
      wherein the first WPT pad and the second WPT pad are configured to transfer power wirelessly, wherein the second main section and the third and fourth vertical sections of the second magnetic structure comprise a ferromagnetic material, and
      wherein an end of each of the third and fourth vertical sections facing the first WPT pad comprises an area smaller than an area of a surface of the first and second side sections facing the second WPT pad.

2. The apparatus of claim 1, wherein a distance between a center of the end of the third vertical section and a center of the end of the fourth vertical section facing the first WPT pad substantially matches a distance between a center of the surface of the first side section and the surface of the second side section facing the second WPT pad.

3. The apparatus of claim 1, wherein each winding on the first WPT pad has an opposite polarity as a winding on the second WPT pad aligned with the winding on the first WPT pad creating an electromagnetic flux pathway across gaps between aligned windings of the first WPT pad and the second WPT pad.

4. The apparatus of claim 1, wherein the first and second windings are connected and the third and fourth windings are connected and wound to create opposite polarities at the first and second windings.

5. The apparatus of claim 1, wherein the first and second vertical sections of the first magnetic structure are substantially perpendicular to the first and second windings where the first and second vertical sections pass the interior area of the first and second windings.

6. The apparatus of claim 1, further comprising a first capacitor bank comprising one or more capacitors, the first capacitor bank connected to the first winding and located in a center section of the first winding and further comprising a second capacitor bank comprising one or more capacitors, the second capacitor bank connected to the second winding and located in a center section of the second winding.

7. The apparatus of claim 6, wherein the first winding connects with the first capacitor bank and the second winding connects with the second capacitor bank along a centerline running through the first WPT pad.

8. The apparatus of claim 7, wherein the first winding and the second winding are wound symmetrical with respect to the centerline.

9. The apparatus of claim 1, wherein the WPT pad is a first WPT pad and further comprising second WPT pad located adjacent to the first WPT pad, wherein the first and second WPT pads are configured to transfer power wirelessly over a gap between the first and second side sections and an end of each vertical sections of the second WPT pad.

10. A wireless power transfer system comprising:
a first wireless power transfer ("WPT") pad comprising:
   a first set of windings aligned within a first plane; and
   a first magnetic structure comprising a plurality of vertical sections and a plurality of side sections comprising a side section for each vertical section of the plurality of side sections, the vertical sections each pass through an interior area of individual windings of the first set of windings, each of the side sections connecting to an end of a vertical section, wherein the plurality of vertical sections of the first magnetic structure each comprise a ferromagnetic material; and
a second WPT pad comprising:
   a second set of windings aligned within a second plane; and
   a second magnetic structure comprising a plurality of vertical sections that each pass through an interior area of individual windings of the second set of windings, wherein the second plane is parallel to, and offset from, the first plane, wherein the plurality of vertical sections of the second magnetic structure each comprise a ferromagnetic material,
   wherein an end of each of the plurality of vertical sections facing the first WPT pad comprises an area smaller than an area of a surface of each of the plurality of side sections facing the second WPT pad.

11. The wireless power transfer system of claim 10, wherein a quantity of the windings of the first set of windings is equal to a quantity of windings in the second set of windings and wherein a geometrical pattern of a layout of the first set of winding matches a geometrical pattern of the second set of windings.

12. The wireless power transfer system of claim 10, wherein a center of each of the plurality of side sections align with a center of corresponding vertical sections of the plurality of vertical sections of the second magnetic structure.

13. The wireless power transfer system of claim 10, wherein the windings on one of the first WPT pad and the second WPT pad transmitting power are connected to a three-phase power source.

14. The wireless power transfer system of claim 10, wherein:
- the first set of windings comprises four windings;
- the plurality of vertical sections of the first magnetic structure comprises four vertical sections, each passing through the interior area of a respective winding of the four windings of the first set of windings;
- the plurality of side sections comprises four side sections;
- the second set of windings comprises four windings; and
- the plurality of vertical sections of the second magnetic structure comprises four vertical sections, each passing through the interior area of a respective winding of the four windings of the second set of windings.

15. A wireless power transfer ("WPT") pad comprising:
- a first winding comprising a first conductive loop, the first winding being aligned with a plane;
- a second winding comprising a second conductive loop, the second winding also aligned with the plane; and
- a first magnetic structure comprising at least a main section, a first vertical section, a second vertical section, a first side section, and a second side section, wherein the first vertical section passes through an interior area of the first winding and is coupled to the first side section and the second vertical section passes through an interior area of the second winding and is coupled to the second side section, wherein the main section, the first and second vertical sections, and the first and second side sections of the first magnetic structure comprise a ferromagnetic material, and wherein the first and second side sections each have a cross sectional area in a direction parallel to the plane that is larger than a cross sectional area of each of the first and second vertical sections in a direction parallel to the plane.

* * * * *